(12) United States Patent
Meling et al.

(10) Patent No.: US 12,366,122 B2
(45) Date of Patent: Jul. 22, 2025

(54) WELL COMPLETION PIPE HAVING FLUID ISOLATED CONDUCTIVE PATH

(71) Applicant: Reelwell AS, Sola (NO)

(72) Inventors: Morten Olav Meling, Stavanger (NO); Espen Alhaug, Stavanger (NO); Marius Hornnes, Stavanger (NO)

(73) Assignee: Reelwell AS, Sola (NO)

( * ) Notice: Subject to any disclaimer, the term of this patent is extended or adjusted under 35 U.S.C. 154(b) by 0 days.

(21) Appl. No.: 18/382,054

(22) Filed: Oct. 19, 2023

(65) Prior Publication Data

US 2024/0052709 A1     Feb. 15, 2024

Related U.S. Application Data

(63) Continuation of application No. PCT/IB2022/053670, filed on Apr. 20, 2022.

(60) Provisional application No. 63/228,393, filed on Aug. 2, 2021, provisional application No. 63/189,955, filed on May 18, 2021, provisional application No. 63/176,980, filed on Apr. 20, 2021.

(51) Int. Cl.
  *E21B 17/02* (2006.01)

(52) U.S. Cl.
  CPC ................. *E21B 17/0285* (2020.05)

(58) Field of Classification Search
  CPC .... E21B 17/0285; E21B 17/042; E21B 17/02; E21B 17/003
  See application file for complete search history.

(56) References Cited

U.S. PATENT DOCUMENTS

| 4,949,797 A * | 8/1990 | Isom ..................... E21B 17/22 |
| | | 175/323 |
| 7,605,715 B2 | 10/2009 | Clark et al. |
| 7,859,426 B2 | 10/2010 | Clark et al. |
| 8,342,865 B2 | 1/2013 | Scheibelmasser et al. |
| 8,922,387 B2 | 12/2014 | Camwell et al. |

(Continued)

FOREIGN PATENT DOCUMENTS

| GB | 2406597 A | 4/2005 |
| WO | 2017/068498 A1 | 4/2017 |
| WO | WO-2020162986 A1 * | 8/2020 ........... E21B 17/042 |

OTHER PUBLICATIONS

International Search Report and Written Opinion, International Application No. PCT/IB2022/053670 dated Aug. 3, 2022.

(Continued)

*Primary Examiner* — Caroline N Butcher
(74) *Attorney, Agent, or Firm* — Richard A. Fagin

(57) ABSTRACT

A well completion pipe has a plurality of pipe joints, each comprising an outer pipe, an intermediate layer disposed inside the outer pipe and an inner pipe disposed inside the layer. The inner pipe extends longitudinally beyond a respective longitudinal end of the outer pipe or the outer pipe extends longitudinally beyond a respective longitudinal end of the inner pipe. The inner pipe and the outer pipe comprise respective threaded connections at each longitudinal end. The respective threaded connections form a metal to metal seal when engaged to corresponding mating threads. A pressure isolated passageway extends through the intermediate layer. In some embodiments, the inner pipe comprises well casing. In some embodiments, the outer pipe comprises a well completion tubular.

35 Claims, 13 Drawing Sheets

(56) References Cited

U.S. PATENT DOCUMENTS

| | | | |
|---|---|---|---|
| 9,458,708 B2 | 10/2016 | Wright et al. | |
| 2014/0353045 A1* | 12/2014 | Zhang | E21B 17/043 175/320 |
| 2019/0119990 A1* | 4/2019 | Fredriksen | E21B 17/028 |

OTHER PUBLICATIONS

Examination Report dated Oct. 23, 2024, for European Application No. 22724252.6.

* cited by examiner

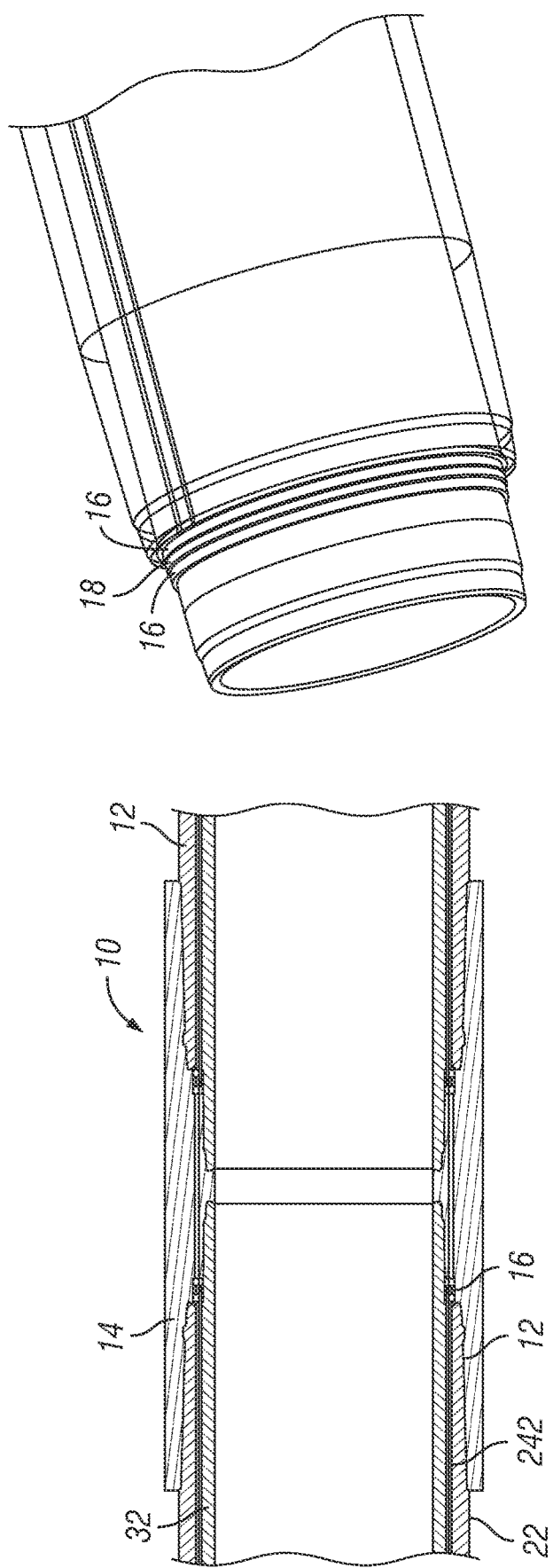
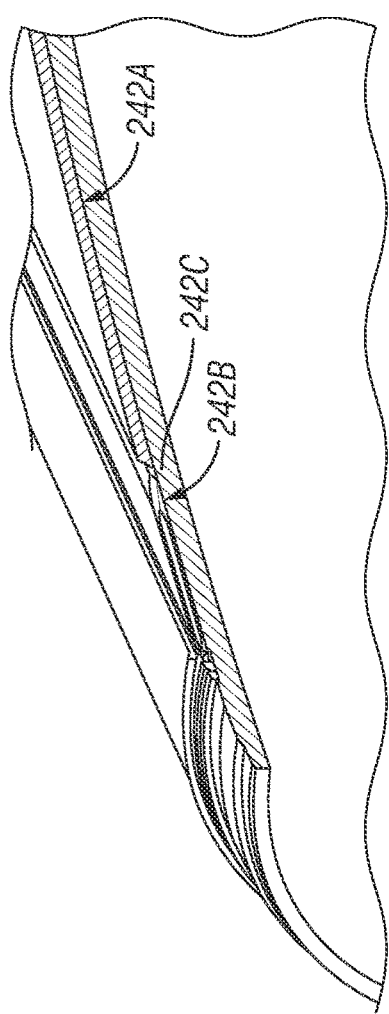

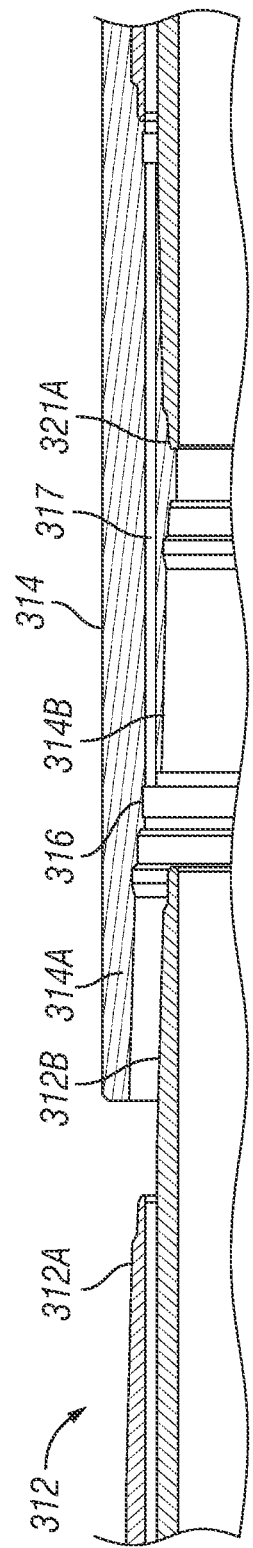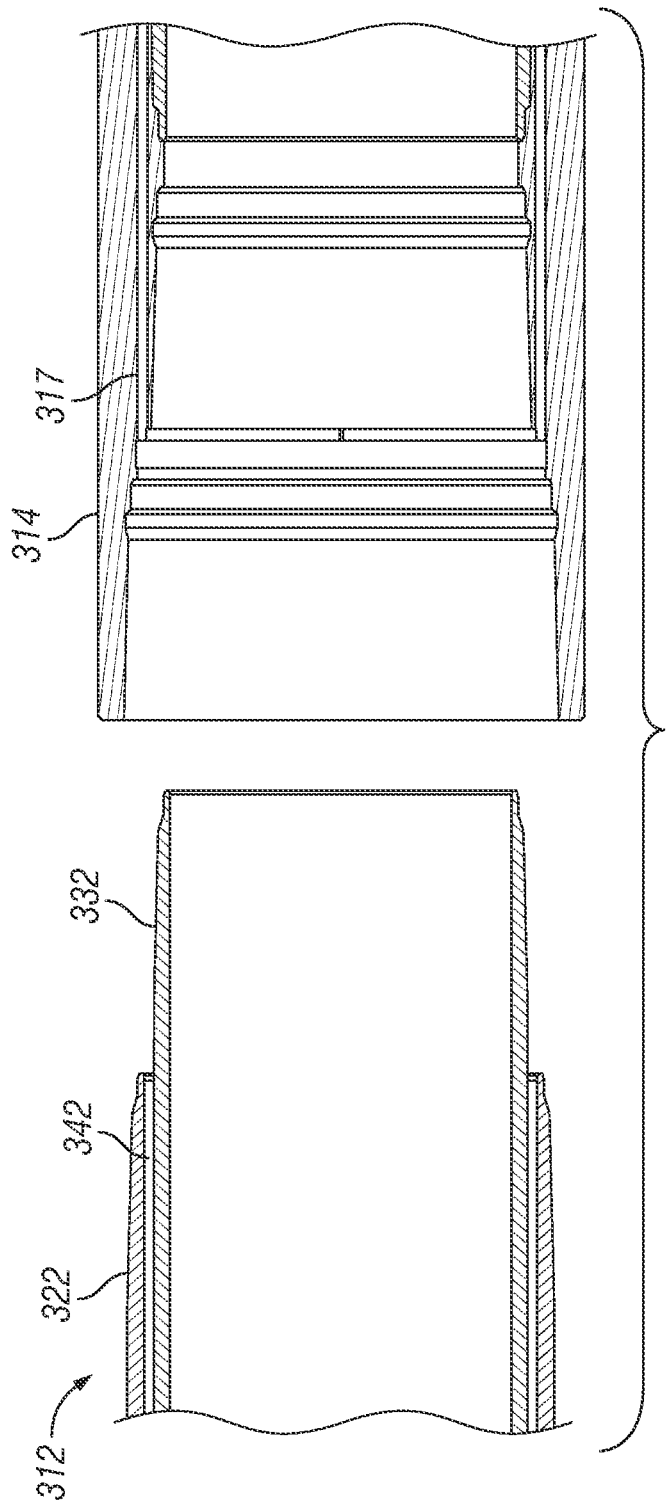

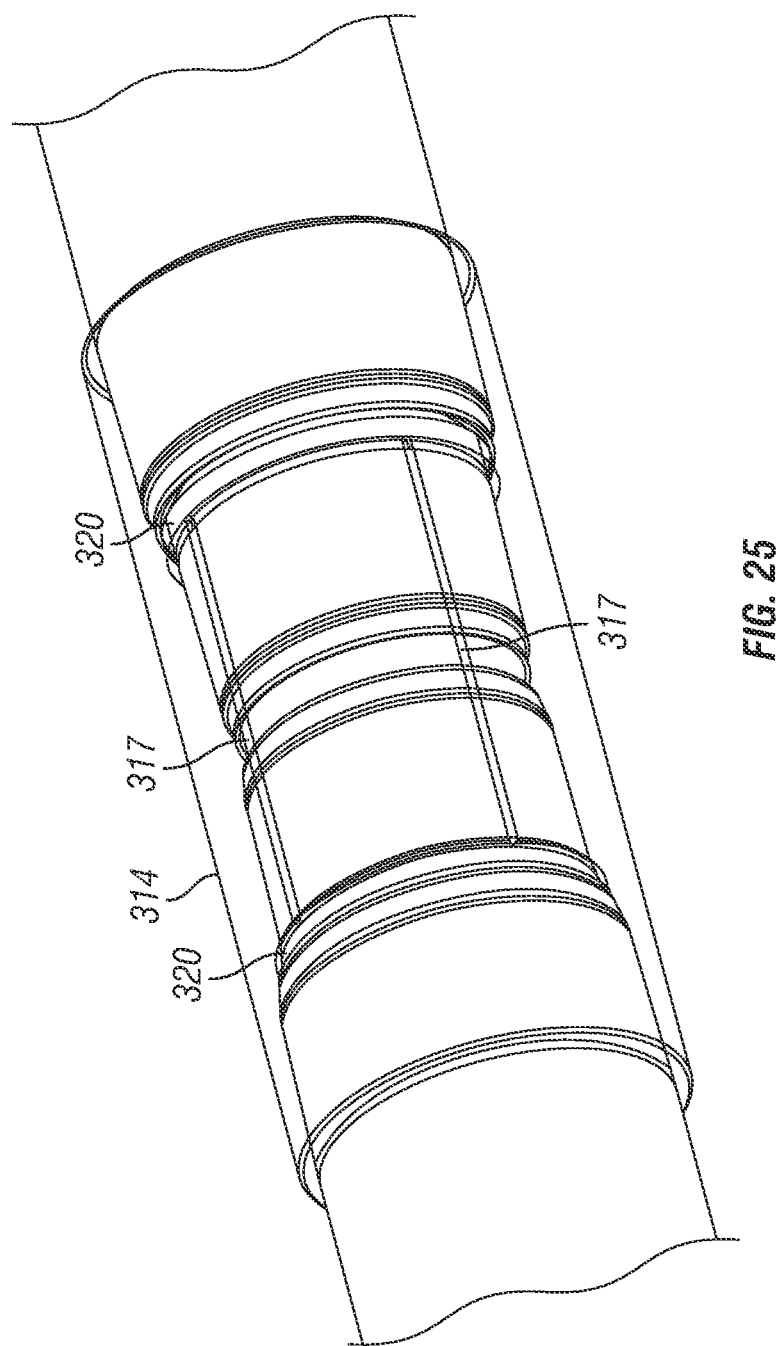

WELL COMPLETION PIPE HAVING FLUID ISOLATED CONDUCTIVE PATH

CROSS REFERENCE TO RELATED APPLICATIONS

Continuation of International Application No. PCT/IB2022/053670 filed on Apr. 20, 2022. Priority is claimed from U.S. Provisional Applications Nos. 63/176,980 filed Apr. 20, 2021; 63/189,955 filed May 18, 2021 and 63/228,393 filed Aug. 2, 2021. Each the foregoing applications is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of construction of subsurface wells. More particularly, the disclosure relates to structures for pipe used to complete such wells, wherein the pipe has fluid isolated conductive path such as an insulated electrical conductor used as a power and signal channel, or an hydraulic or pneumatic control line associated with the pipe.

Canadian Patent No. 3,002,675 and U.S. Pat. No. 11,236,551 describe a structure for and a method for making well drilling pipe (drill pipe) having an insulated electrical conductor that may be used as a channel for electrical power and signal communication between the surface and one or more electrically powered tools in a well while it is being drilled. In general, the pipe described in the foregoing publications uses industry standard sections (joints) of drill pipe. The pipe has inserted therein an electrical insulation layer on the interior surface of the pipe joints, and has an electrical conductor structure radially expanded against the insulation layer and bonded to the insulation layer. The electrical conductor structure is made so that it can be radially expanded, longitudinally contracts as a result of being radially expanded, and undergoes no plastic deformation by reason of the radial expansion.

The pipe structure disclosed in the foregoing publications is particularly adapted for conditions during well drilling, in particular, bending and cyclic torsional stresses applied to the assembled joints of pipe (the pipe "string") while moving in a wellbore, repeated axial loading and unloading, and repeatedly making and breaking threaded connections between joints or "stands" (joints assembled into sections of two, three or four joints) as the well drilling progresses. It is contemplated that such drill pipe will be removed from service due to metal fatigue or the threaded connections at the longitudinal ends of each pipe joint becoming unserviceable as the pipe joints have such threaded connections repeatedly recut. Recut of threaded pipe connections is used to keep drill pipe in service after the threaded connections become damaged during use and handling.

More recently, there is interest in using a so-called "wired" pipe to provide electrical power and signal communication channels for wells on which drilling is finished, and the wells require installation of a casing or liner to protect exposed formations and to seal the well from fluid movement between rock formations at different depths. Such casing or liner is known to be placed in the well after drilling is ended, and such casing or liner is held in place in the wellbore by cement. The casing or liner may then be completed, for example, by perforating within rock formations expected to produce fluids such as oil and gas. Corresponding conditions may apply to wells in which one or more hydraulic or pneumatic control lines may be used, such as to operate inflow control devices or safety valves.

It may be reasonably expected that casing or liner may be exposed to flowing fluid for an extended period of time, and in some cases at elevated temperatures depending on the depth from which the fluids enter the well. As a result, a casing or liner having an electrical conductor made as described in the foregoing publications may not be best suited for such conditions. The pipe structure disclosed in the foregoing patent publications is not suitable for use with hydraulic and/or pneumatic control lines. The foregoing issues may be equally understood to be relevant to smaller diameter pipe, called tubing, ordinarily nested within a casing or liner in a well. Collectively, such pipe may be referred to as well completion pipe or wellbore tubular(s).

Accordingly, there is a need for a well completion pipe having one or more insulated electrical conductors, or hydraulic or pneumatic control lines that is better adapted to resist failure by reason of long term fluid flow and exposure to elevated temperature.

SUMMARY

One aspect of the present disclosure relates to a "wired" well completion pipe. A well completion pipe according to this aspect of the disclosure has a plurality of wellbore tubular joints, each comprising a joint of wellbore tubular, an electrical insulation, bonding and conducting layer disposed inside the joint of wellbore tubular and an inner pipe disposed inside the electrical insulation. The inner pipe extends longitudinally beyond a respective longitudinal end of the joint of wellbore tubular, or the joint of wellbore tubular extends longitudinally beyond a respective longitudinal end of the inner pipe. The inner pipe and the joint of wellbore tubular comprise respective threaded connections at each longitudinal end. The respective threaded connections form a metal to metal seal when engaged to corresponding mating threads. An electrical contact disposed at each longitudinal end of the joint of wellbore tubular is in electrical contact with an electrical conductor in the electrical insulation, bonding and conducting layer.

Some embodiments further comprise a collar having at each longitudinal the corresponding mating threads and an insulated electrical conductor extending between longitudinal ends of the collar, the insulated electrical conductor comprising an insulated electrical contact disposed between an inner one of the corresponding mating threads and an outer one of the corresponding mating threads.

In some embodiments, the insulated electrical conductor is disposed in a longitudinal bore extending along an interior of a wall of the collar.

In some embodiments, the electrical conductor comprises a wire braid.

In some embodiments, the electrical contact is disposed between wiper seals.

In some embodiments, the respective threaded connections on the inner pipe and the joint of casing have the same pitch.

In some embodiments, the electrical insulation, bonding and conducting layer comprises an electrically insulating material on an outer surface, the electrical conductor nested within the insulating material and an electrical insulator arranged to electrically insulate the electrical conductor from the inner pipe and the joint of wellbore tubular.

In some embodiments, the joint of wellbore tubular, the electrical conductor and the inner pipe are electrically insulated from each other.

In some embodiments, the inner pipe extends longitudinally beyond a respective longitudinal end of the joint of wellbore tubular at one longitudinal end and the joint of wellbore tubular extends longitudinally beyond a respective longitudinal end of the inner pipe at the opposed longitudinal end.

A well completion pipe having a pressure isolated conductive path according to another aspect of this disclosure includes a plurality of pipe joints. Each pipe joint comprises an outer pipe, an intermediate layer having a passageway extending longitudinally along the intermediate layer, the intermediate layer disposed inside the outer pipe, and an inner pipe disposed inside the intermediate layer. Either (i) the inner pipe extends longitudinally beyond a respective longitudinal end of the outer pipe or (ii) the outer pipe extends longitudinally beyond a respective longitudinal end of the inner pipe. The inner pipe and the outer pipe comprise respective threaded connections at each longitudinal end, wherein the respective threaded connections form a metal to metal seal when engaged to corresponding mating threads. The intermediate layer terminates longitudinally between respective longitudinal ends of the inner pipe and the outer pipe, such that the passageway is exposed at each longitudinal end of the intermediate layer.

Some embodiments further comprise a collar having at each longitudinal end the corresponding mating threads and a through bore extending between longitudinal ends of the collar. The through bore terminates longitudinally between an inner one of the corresponding mating threads and an outer one of the corresponding mating threads.

In some embodiments, an insulated electrical conductor is disposed in the through bore in the collar.

In some embodiments, the intermediate layer comprises an insulated electrical conductor.

In some embodiments, the insulated electrical conductor comprises a flat cable or a wire braid.

In some embodiments, an electrical contact is coupled to each longitudinal end of the intermediate layer, and the electrical contact is disposed between wiper seals.

In some embodiments, the respective threaded connections on the inner pipe and the outer pipe have a same pitch.

In some embodiments the intermediate layer comprises an electrically insulating material disposed on an outer surface. An electrical conductor is nested within the insulating material and an electrical insulator is arranged to electrically insulate the electrical conductor from the inner pipe and the outer pipe.

In some embodiments, the outer pipe, the electrical conductor and the inner pipe are electrically insulated from each other.

In some embodiments, the inner pipe extends longitudinally beyond a respective longitudinal end of outer pipe at one longitudinal end and the outer pipe extends longitudinally beyond a respective longitudinal end of the inner pipe at the opposed longitudinal end.

In some embodiments, the inner pipe comprises well casing.

In some embodiments, the outer pipe comprises well casing.

Some embodiments further comprise a make up tool joint having at one longitudinal end. The corresponding mating threads and an insulated electrical conductor extend between longitudinal ends of the make up tool joint. The insulated electrical conductor comprises an insulated electrical contact disposed between an inner one of the corresponding mating threads and an outer one of the corresponding mating threads. The make up tool joint has at another longitudinal end an inner threaded connection and an outer threaded connection having respective thread dimensions to threadedly engage either: (i) corresponding mating threads on a collar, wherein the collar comprises at each longitudinal end the corresponding mating threads and an insulated electrical conductor extending between longitudinal ends of the collar, wherein the insulated electrical conductor comprises an insulated electrical contact disposed between an inner one of the corresponding mating threads and an outer one of the corresponding mating threads or (ii) corresponding mating threads on another make up tool joint.

In some embodiments, the intermediate layer comprises a sleeve.

In some embodiments, the sleeve comprises a malleable, ductile metal.

In some embodiments, the malleable, ductile metal comprises aluminum.

In some embodiments, an insulated electrical conductor is disposed in a groove formed on a surface of the sleeve or in a gap between circumferential ends of the sleeve.

In some embodiments, the intermediate layer comprises an insulated electrical conductor, and the inner pipe and the outer pipe are in interference fit with each other.

In some embodiments, the intermediate layer comprises a layer of insulating material having a closed circumference and a layer of electrically conductive material having a closed circumference.

Some embodiments further comprise a make up tool joint having at one longitudinal end, the corresponding mating threads. The make up tool joint at another longitudinal end has an inner threaded connection and an outer threaded connection having respective thread dimensions to threadedly engage either (i) corresponding mating threads on a collar, wherein the collar comprises at each longitudinal end the corresponding mating threads and a through bore extending between longitudinal ends of the collar, the through bore terminating in a chamber disposed between an inner one of the corresponding mating threads and an outer one of the corresponding mating threads or (ii) corresponding mating threads on another make up tool joint.

Other aspects and advantages will be apparent from the description and claims that follow.

BRIEF DESCRIPTION OF THE DRAWINGS

FIG. 13 shows a cross sectional view of another embodiment of two segments (joints) of completion pipe according to the present disclosure threadedly coupled by a collar.

FIG. 14 shows an oblique, cut away view of one of the pipe joints shown in FIG. 13.

FIG. 15 shows an enlarged section of a view similar to that shown in FIG. 14.

FIGS. 23 and 24 show assembly of a well completion pipe joint to a collar.

FIG. 25 shows a cut away view of well completion pipe joints assembled to a collar to better illustrate multiple fluid through bores in the collar.

DETAILED DESCRIPTION

Figure 1:
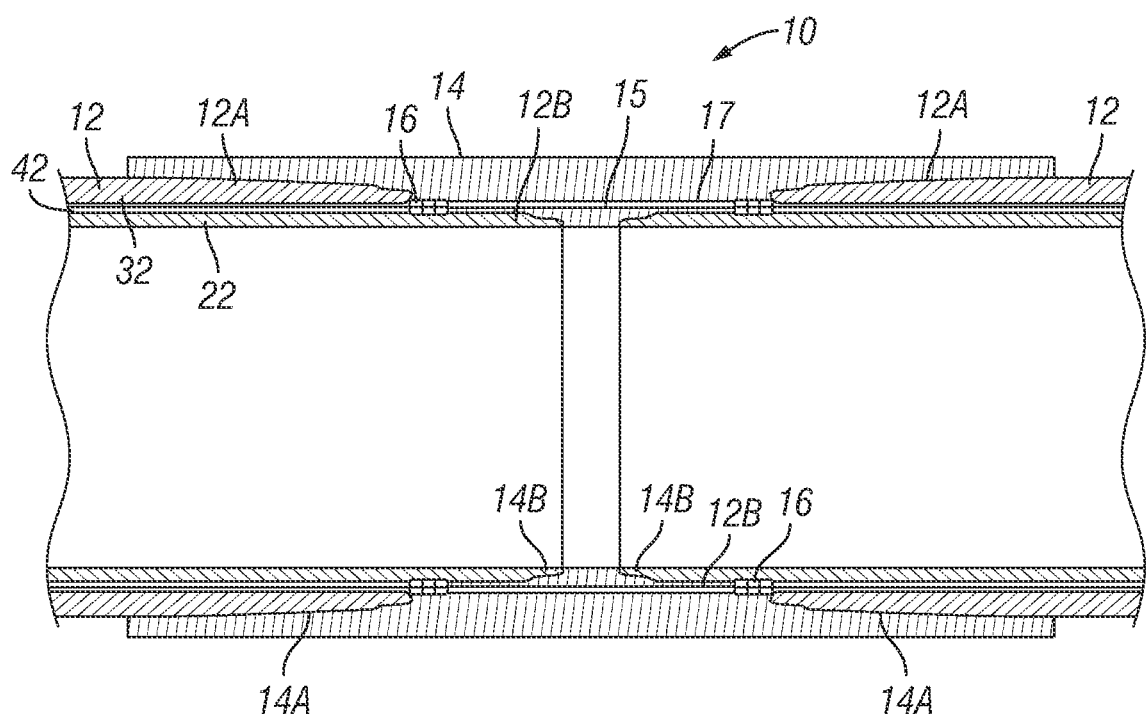
FIG. 1 shows a cross sectional view of two segments (joints) of completion pipe according to the present disclosure threadedly coupled by a collar.

Various embodiments of a well completion pipe according to the present disclosure may be described in general as having a fluid pressure isolated, conductive path extending along the well completion pipe. In various embodiments, the pressure isolated, conductive path may be disposed between an inner pipe nested within an outer pipe. Either the inner pipe or the outer pipe may be an industry standard size, wall thickness and thread structure form of well completion pipe known as "casing", ":tubing" or "liner", and may be referred to herein as a wellbore tubular or well pipe. The pressure isolated conductive path may be disposed in an intermediate layer nested between the inner pipe and the outer pipe. The pressure isolated conductive path may be a fluid channel to enable conducting fluid such as hydraulic fluid or compressed gas for purposes of operating certain devices in a well such as inflow control devices and safety valves. The pressure isolated conductive path in some embodiments may contain at least one insulated electrical conductor for use in wells wherein electrical power and/or signal communication are to be provided between the surface and certain devices located in the well.

In both hydraulic/pneumatic embodiments and in electrical embodiments, either the inner pipe extends longitudinally beyond the longitudinal ends of the outer pipe, or the outer pipe extends longitudinally beyond the longitudinal ends of the inner pipe, depending on whether it is the inner pipe or the outer pipe which is formed from the conventional casing, tubing or liner segment ("joint"). When the well completion pipe joint is connected to an adjacent pipe joint, in some embodiments using a "collar", a metal to metal seal is formed between the collar and the connected pipe joints for both the inner pipe and the outer pipe. Thus, a longitudinal space between the metal to metal seal of the inner pipe to the collar, and the metal to metal seal between the outer pipe and the collar is isolated from well fluid both externally and internally. It then becomes possible to provide a pressure isolated pathway, either electrical or hydraulic, along the well completion pipe.

A circumferential ring, groove, chamber or channel may be formed in any part of the longitudinal space between the metal to metal seals, whereby a fluid isolated chamber is formed between the inner pipe and the outer pipe and the collar. One or more longitudinal bores may connect the annular ring, groove or chamber on one side of the collar to the circumferential ring, groove or chamber to the circumferential ring, groove or chamber on the opposed side of the collar. In hydraulic/pneumatic embodiments, the one or more longitudinal bores conduct fluid longitudinally from one longitudinal side of the collar to the other longitudinal side. In electrical embodiments, an insulated electrical conductor may extend through the one or more longitudinal bores and be terminated at each end by an electrical contact disposed in the circumferential ring, groove or channel. As will be explained further below, the circumferential ring, groove or channel may be formed between the longitudinal termination of the outer pipe and the collar, and between the longitudinal termination of the inner pipe and the collar without the need to separately form any such ring, groove or channel in the outer pipe or the inner pipe.

In both hydraulic/pneumatic embodiments and in electrical embodiments, the pressure isolated conductive path is formed in, by or with the intermediate layer in each pipe joint. The intermediate layer terminates in the circumferential ring, groove or channel proximate each longitudinal end of the pipe joint. In hydraulic/pneumatic embodiments, the pressure isolated conductive path may be a longitudinally extending opening in the intermediate layer, terminating at each end in the circumferential ring, groove or channel. In electrical embodiments, an insulated electrical conductor may be embedded in or extend along the intermediate layer, terminating at each end by an electrical contact disposed in the circumferential ring, groove or channel.

As used throughout this disclosure, the term "pressure isolated conductive path" means a channel, pathway, conductor (electrical or mechanical), tube, conduit or any corresponding structure capable of carrying moving fluid or electric current. Such structure either conducts electricity and/or enables movement of fluid, wherein such channel, pathway, conductor or corresponding structure is pressure isolated from well fluid, both externally by the outer pipe, and internally by the inner pipe. Conduction of fluid and/or electricity across pipe connections is made in a zone disposed longitudinally between the inner and outer metal to metal seals at each pipe connection. Such conduction may be made by mating electrical contacts and/or simple fluid connection between the metal to metal seals.

An example electrical embodiment of a well completion pipe 10 having an insulated electrical conductor according to the present disclosure is shown in cross sectional view in FIG. 1. A well completion pipe, which when assembled may be referred to as a "string", one portion of which is shown at 10, may extend from the Earth's surface to a chosen depth in a well, and may be assembled from a plurality of individual "wired" completion pipe joints 12 coupled end to end using internally threaded connectors known in the art as collars 14. Each wired completion pipe joint 12 of the well completion pipe 10 may comprise a male outer threaded connection 12A, and a male inner threaded connection 12B at its longitudinal ends, as is conventional for well completion pipe, and the collars 14 may comprise, with respect to position along the diameter of the pipe, respective inner 14B and outer 14A female threaded connections to mate with the corresponding male threaded connections 12A, 12B on each wired completion pipe joint 12 when the wired completion pipe joint 12 is coupled to a collar 14.

The collar 14 may comprise insulated electrical contacts 16 disposed longitudinally below the base of the respective outer threaded connections 14A, and above the respective inner threaded connections 14B. The insulated electrical contacts 16 may be disposed around the entire relevant circumference of the collar 14 so that the relative rotational orientation of the pipe joint and the collar 14 do not affect the electrical connection across the insulated electrical contacts 16. The insulated electrical contacts 16 may be electrically connected to each other across the collar 14 by an insulated wire 15 disposed in a through bore 17 drilled inside the interior wall of the collar 14 longitudinally between the locations of the insulated electrical contacts 16. As will be further explained below with reference to hydraulic/pneumatic embodiments of a completion pipe, more than one such through bore 17 may be formed in the collar 14 to facilitate movement of fluid.

Each completion pipe joint 12 may be made by using a segment or joint of conventionally dimensioned (i.e., diameter, length, wall thickness and thread type as set forth below) well completion pipe, such as casing, tubing or liner, to serve the function of an outer pipe. The outer pipe may be made from steel or other high strength metal and is shown generally in partial view at 32. For convenience, the outer pipe 32 will be referred to as a "pipe joint" or a "wellbore tubular joint" for the present example embodiment to distinguish it from a finished well completion pipe joint 12 according to the present disclosure. "Wellbore tubular" may be used in the appended claims in order to fully distinguish such pipe from the inner pipe (or the outer pipe in some embodiments). "Conventionally dimensioned" as used herein is intended to mean that the metal grade, joint length, external diameter, drift internal diameter, nominal internal diameter and wall thickness in the wellbore tubular or pipe joint 32 may be the same as would ordinarily be specified by a well construction designer. As will be appreciated by those skilled in the art, the foregoing specifications are chosen with reference to the depth to which the well completion pipe is to be inserted, expected fluid pressures in formations penetrated by the well, and the specific weight of the well completion pipe 10. Configuration of threaded connections 12A on the pipe joint 32 will be further described below, but when such threaded connections 12A are cut on the pipe joint 32, the threads may be the same configuration, e.g., thread type, pitch, taper and diameter as those of a correspondingly sized conventional wellbore tubular joint.

When assembled, the well completion pipe 10 may be expected to be specified, assembled and run into a well in substantially the same way as a conventional well completion pipe not having an insulated electrical conductor or pressure isolated conductive path. The casing joint 32 may have disposed on its interior surface an intermediate layer 42. The intermediate layer 42 in the present example embodiment may be a composite structure referred to for convenience as a "bonding, conducting and insulating layer 42." The bonding, conducting and insulating layer 42 may have the properties of: (i) providing a mechanical bond to the interior surface of the casing joint 32; (ii) providing an electrical insulator between an electrical conductor (not shown separately) and the casing joint 32 or the inner pipe 22; and (iii) have sufficient shear strength to transmit a certain amount of torque to an inner pipe 22 as explained further below. The bonding, conducting and insulating (intermediate) layer 42 may be structured as a nested arrangement having an electrical insulating material on the outer surface, an electrical conductor nested within the electrical insulating material and an inner electrical insulator nested within the electrical conductor or otherwise formed to insulate the electrical conductor from the casing joint 32 and the inner pipe 22. In some embodiments, the bonding, conducting and insulating layer 42 may comprise a closed circumference for either or both the electrical insulating material and the electrical conductor. Closed circumference in the present context is used to mean that either or both the electrical insulating material and the electrical conductor cover substantially all of the outer surface of the inner pipe 22 or the inner surface of the outer pipe, e.g., the casing joint 32. Other embodiments explained further below may have an intermediate layer that does not form a closed circumference.

The inner pipe 22 may be made from high strength material such as steel or other material used in well construction pipe. The inner pipe 22 may extend longitudinally at each end past the longitudinal ends of the pipe joint 32 in a manner to be explained further below. The inner pipe 22 may be inserted into the interior of the bonding, conductor and insulating layer 42 and bonded to the bonding, conductor and insulating layer 42. The nominal outer diameter of the inner pipe 22 may be chosen to enable relatively free longitudinal movement inside the bonding, conductor and insulating layer 42 during assembly of a completion pipe joint 10, yet be able to mechanically or otherwise bonded to the outer surface of the bonding, conductor and insulating layer 42. By such bonding, torque may be transferred from the casing joint 32 to the inner pipe 22 when making up connections to a respective collar 14.

In some embodiments, the bonding, conductor and insulating layer 42 may comprise a layer of an insulating, bonding material such as epoxy, grout and/or glass fiber (with adhesive) and a layer of electrically conductive material, e.g., copper, formed into a wire, braid or other structure that resists plastic deformation when the pipe 10 is moved through a wellbore and is subjected to bending stress.

Figure 2:
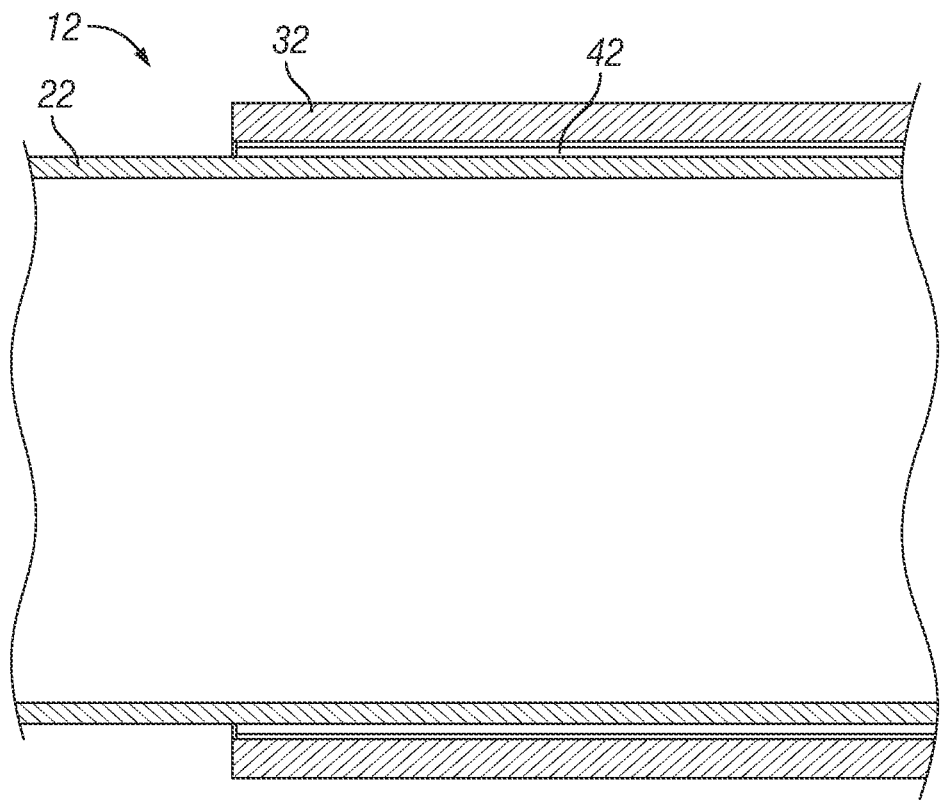
FIG. 2 shows a cross sectional view one longitudinal end of an inner pipe bonded to an outer pipe prior to machining threaded connections on longitudinal ends of a pipe joint.

FIG. 2 shows an unfinished well completion pipe joint 12 after assembly of the inner pipe 22 to the intermediate layer, e.g., the bonding, conductor and insulating layer 42, and the bonding, conductor and insulating layer 42, being bonded to the inside of the casing joint 32. What is shown in FIG. 2 is prior to forming the threaded connections (12A, 12B in FIG. 1) on the longitudinal ends of the inner pipe 22 and on the casing joint 32. The inner pipe 22, as explained above, extends at each longitudinal end a predetermined distance beyond the corresponding longitudinal ends of the pipe joint 32. The bonding, conductor and insulating layer 42 may be longitudinally coextensive with the pipe joint 32, or, referring for the moment to FIG. 5, may extend longitudinally past the longitudinal ends of the pipe joint 32 to provide an exposed electrical contact to the electrical conductor (not shown separately) embedded in the bonding, conductor and insulating layer 42.

Figure 3:
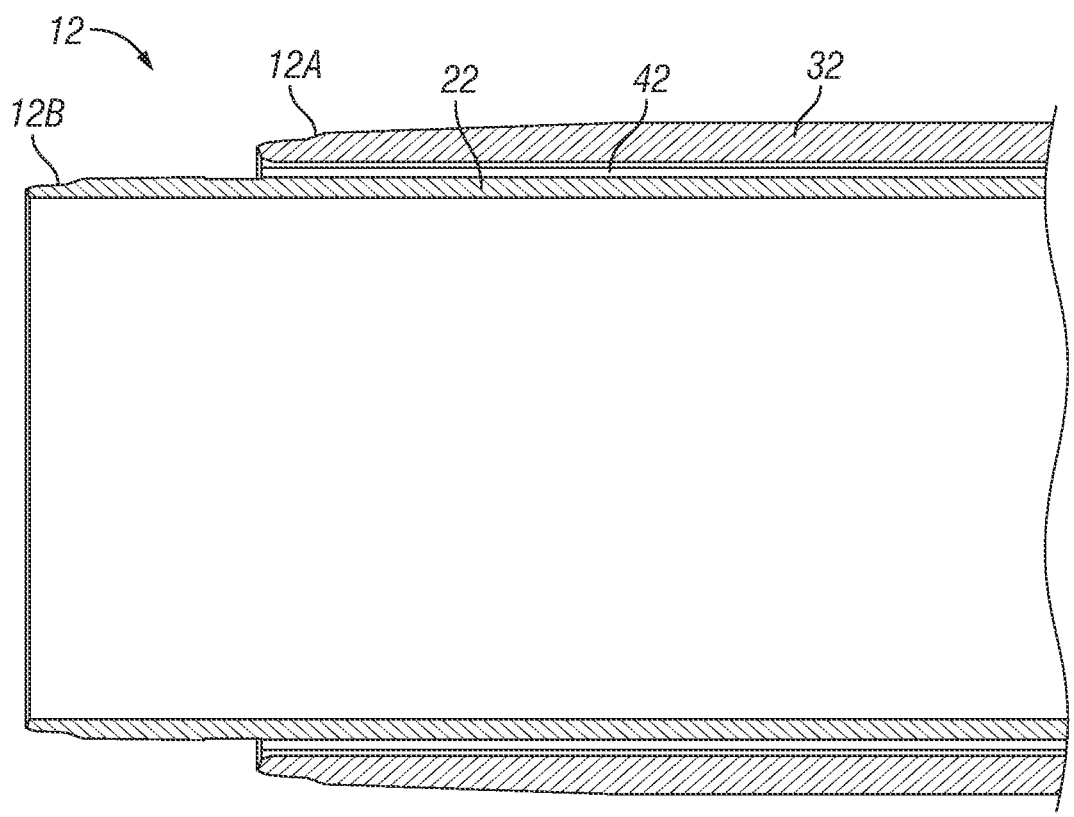
FIG. 3 shows the longitudinal end shown in FIG. 2 after machining threads to form male connections (pins) on the inner and outer pipe.

FIG. 3 shows an example embodiment of the wired completion pipe joint 12 after the respective threaded connections are cut on the longitudinal ends of the inner pipe 22, shown at 12B, and on the pipe joint 32, shown at 12A. The threaded connections 12A, 12B may have the same pitch, and may both form a metal to metal seal when made up to corresponding threaded connections (see FIG. 4) in the collar (14 in FIG. 4).

Figure 4:
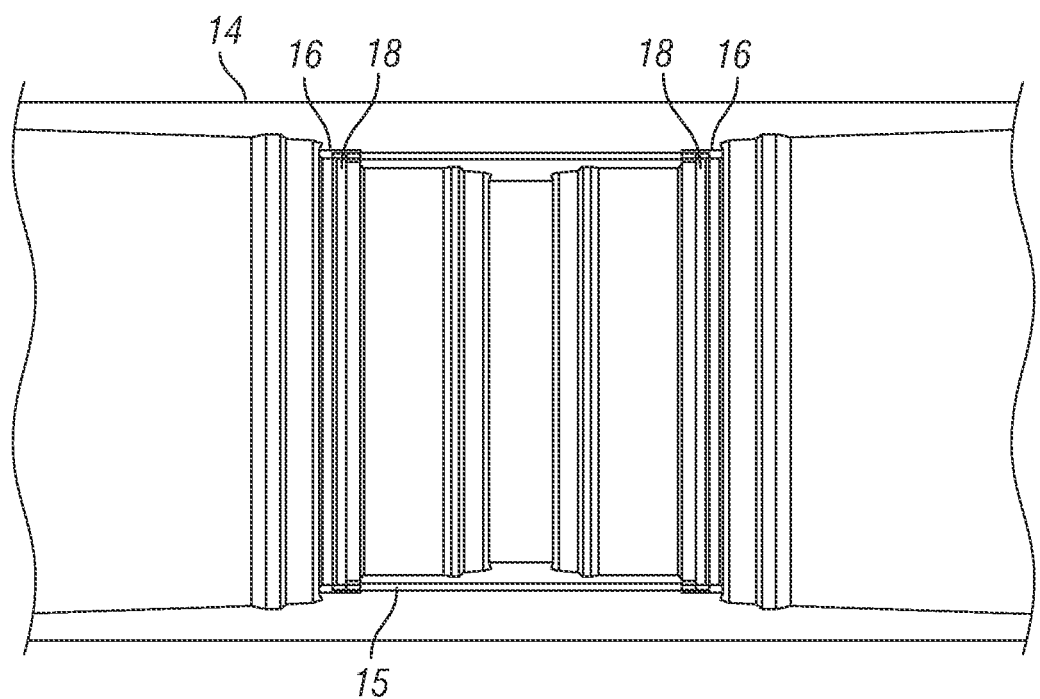
FIG. 4 shows a perspective view of the assembled joints and collar as FIG. 1 to better illustrate electrical connection and isolation features of a completion pipe according to the present disclosure.

FIG. 4 shows a perspective view of an example embodiment of a collar 14. The insulated electrical contacts 16 may be enclosed in elastomer wiper seals 18 to provide a "wet connect" function to corresponding electrical contacts on each completion pipe joint 12. That is, the wiper seals 18 may clean any fluid from the electrical contacts 16 when the wired completion pipe is assembled. The wiper seals 18 may, but are not required to provide a pressure resistant barrier to fluid movement. Fluid may be prevented from moving out of the interior of the assembled completion pipe (10 in FIG. 1) because each wired completion pipe joint (12 in FIG. 1) forms a metal to metal seal with the collar 14 when the inner threaded connection (12B in FIG. 1) on each wired completion pipe joint 12 is made up to the corresponding inner threaded connection 14B in the collar 14. Fluid may be prevented from entering the assembled completion pipe 10 by corresponding metal to metal sealing between the outer threaded connections (12A in FIG. 1) on the completion pipe joints (12 in FIG. 1) and corresponding threaded connection 14A in the collar 14. Thus, a zone disposed longitudinally between metal to metal seals (explained with reference to FIG. 7) is isolated from well fluid both internally and externally to the assembled well completion pipe 10.

Structural load of the assembled completion pipe 10 as a casing or liner in a well may be carried in part by the assembled pipe joints (32 in FIG. 1). Depending on the structural properties of the inner pipe 22 and the pipe joint (32 in FIG. 1), the bonding, conductor and insulating layer (42 in FIG. 1) may only need to transmit enough torque to the inner pipe 22 to make the metal to metal seal. The inner pipe 22 may carry part of the additional axial loading in an assembled wired completion pipe string resulting from the weight of the inner pipe 22.

Figure 5:
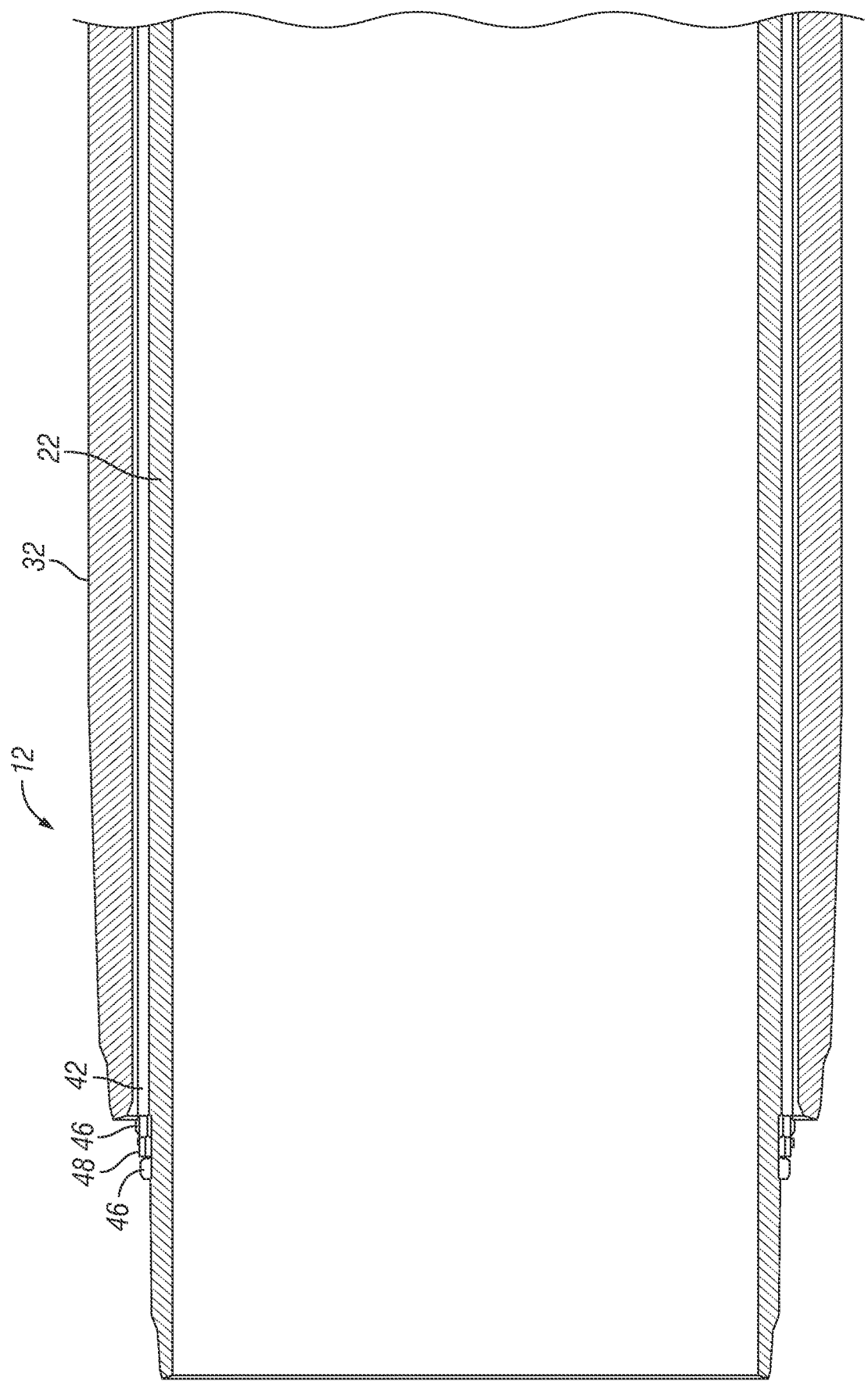
FIG. 5 shows an example embodiment of a practical implementation of a wired completion pipe joint according to the present disclosure

An example practical electrical implementation of a well completion pipe joint is shown in cross sectional view at 12 in FIG. 5. The principal features of the well completion pipe joint may be similar to those described with reference to FIG. 1, with the additional feature that the electrical conductor (not shown separately) in the bonding, conductor and insulating layer 42 may extend longitudinally past the ends of the pipe joint 32, and terminate in a respective electrical contact 48. The electrical contact 48 may be disposed in or between wiper seals 46. The respective electrical contact 48 may, as explained above, circumscribe the entire circumference of the extending portion of the inner pipe 22. The electrical contact 48 may be arranged to make physical contact with, and thus electrical contact, with the corresponding electrical contact (16 in FIG. 4) in the collar (14 in FIG. 4) when the wired completion pipe joint 12 is assembled to a collar 14. The wiper seals 46 on the wired completion pipe joint 12 may perform a similar function to those seals described with reference to FIG. 4, namely, to enable wet connection of the pipe, but not necessarily to exclude fluid under pressure from traversing the wiper seals 46.

Referring once again to FIG. 1, the example embodiments of a well completion pipe 10 as disclosed herein include an insulated electrical conductor disposed within the intermediate layer, i.e., the bonding, conductor and insulating layer 42. Either or both the inner pipe 22 and the pipe joint 32 may be used as a second electrical conductor for communication of electrical power and/or signals along an assembled well completion pipe 10. It will be appreciated that because the electrical conductor is insulated from both the inner pipe 22 and the pipe joint 32, it is possible in some embodiments to use the inner pipe 22, electrical conductor and pipe joint 32 as three separate electrical conductors to be used for applications requiring three conductors, e.g., three phase electrical power to operate devices such as electric submersible pumps. Such embodiments may require electrical insulation across the collar 14 between the inner pipe 22 and the collar.

Figure 6:
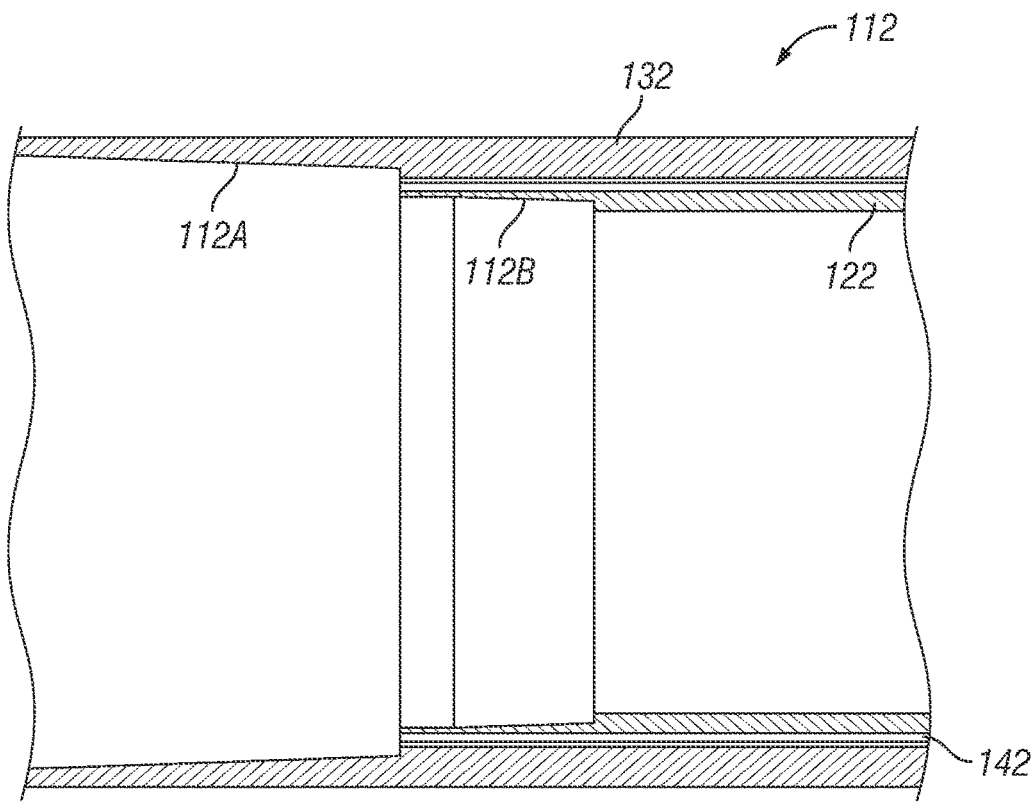
FIGS. 6 and 7 show an example embodiment of a well completion pipe having opposite types of threaded connections as the example embodiment shown in and described with reference to FIG. 1.

The example embodiments explained with reference to FIGS. 1 through 5 relate to joints of well completion pipe in which the threaded connections on both longitudinal ends of the pipe joints are male (called pin X pin) connections. The collars 14 have female threaded connections at each end (called box X box connections). It is to be understood that the scope of this disclosure is not limited to such arrangements of threaded connections. Referring to FIG. 6, an example embodiment of a well completion pipe joint 112 is shown in cross-sectional view, wherein the outer pipe 132 and the inner pipe 122 comprise respective female threaded connections 112A, 112B at the illustrated longitudinal end. The intermediate layer, e.g., an insulating, conducting and bonding layer 142, may be made similarly to the embodiments explained with reference to FIGS. 1 through 5. In the embodiment of FIG. 6, the longitudinal ends of the outer pipe 132 may extend longitudinally beyond the corresponding longitudinal ends of the inner pipe 122 to provide suitable receptacles, i.e., female threaded connections, for corresponding male threaded connections on a pin X pin conduit connector (an inversely, male threaded connection to a conventional collar), to be explained with reference to FIG. 7.

Figure 7:
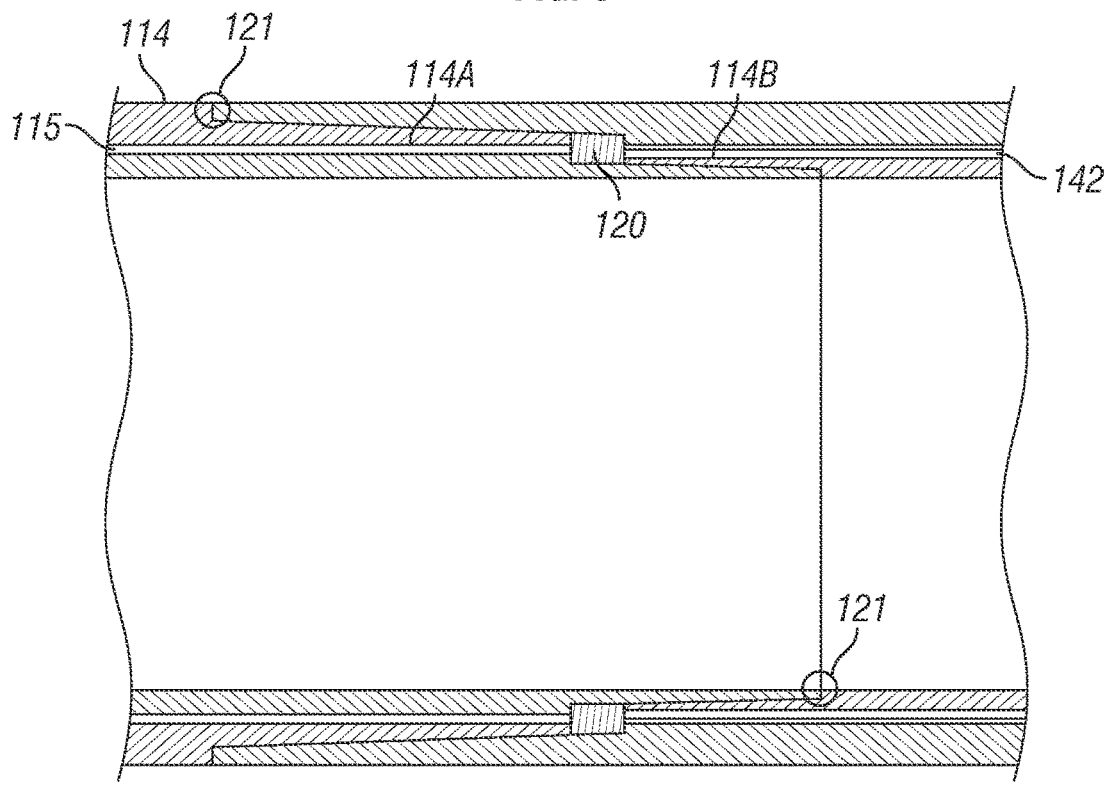

In FIG. 7, the well completion pipe joint 112 of FIG. 6 is shown assembled to a corresponding conduit connector 114. The conduit connector 114 may have an inner threaded connector 114B having diameter and thread to engage the inner threaded connector (112B in FIG. 6) on the well completion pipe joint 112. The conduit connector 114 may also comprise an outer threaded connection 114A to engage the outer threaded connector 112A on the wired completion pipe joint 112. The inner threaded connections (114B, 112B) and the outer threaded connections (114A, 112A) when engaged may form metal to metal seals as shown generally at 121. A shoulder area 120 may be formed in respective parts of the conduit connector 114 and the wired completion pipe joint to dispose electrical contacts and wiper seals (not shown in FIG. 7) of any type known in the art. The conduit connector 114 may comprise a bore 115 for passage of an insulated electrical conductor (not shown) to enable electrical connection of the conductor (not shown separately) in the insulating, conducting and bonding layer 142. In hydraulic/pneumatic embodiments of a well completion pipe, the shoulder area may form an hydraulic or pneumatic connection between the pipe joint and conduit connector and may, as in electrical embodiments, extend around the entire circumference of the pipe joint and the conduit connector (or collar in box X box connectors, i.e., conventional collars)

It will be appreciated by those skilled in the art that it is within the scope of the present disclosure to have threaded connections at one end of one or more well completion pipe joints, and corresponding threaded connections on the adjacent conduit connector substantially as shown in FIGS. 6 and 7, while at the other end of any one or more such joints of wired well completion conduit, threaded connections as shown in FIGS. 1 and 2 may be provided, the resulting joints referred to as "pin X box" connection.

In some embodiments, it may be preferable to have the structural pipe, that is, the conventional joint of well completion pipe (e.g., casing, liner or tubing) disposed in the interior of a nested pipe segment, that is, the conventional pipe joint is disposed within the outer pipe. The outer pipe in such embodiments may perform the function of an insulated electrical conductor, similar to what is performed by the "inner pipe" in previously described embodiments. Such embodiment having an external pipe and an internal pipe joint will be explained with reference to FIGS. 8 through 12. In such embodiments, the intermediate layer, e.g., the bonding, conductor and insulating layer 42 may comprise a separate electrical conductor within or on a layer of insulating material as explained above, or the separate electrical conductor may be omitted.

Figure 8:
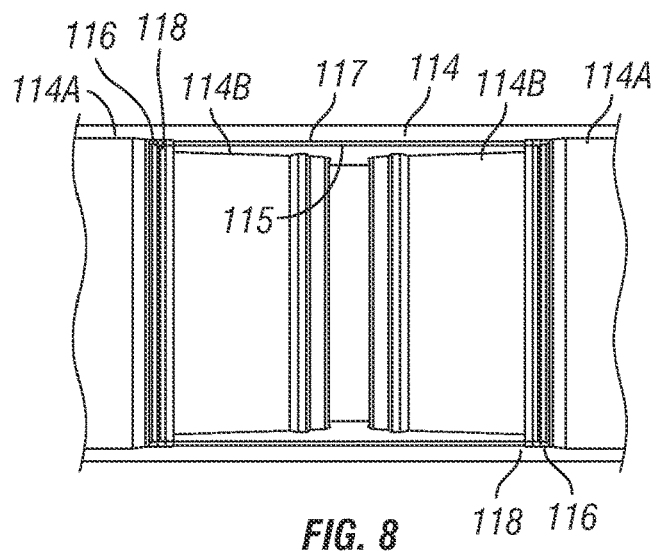
FIG. 8 shows an example embodiment of a double female (box x box) threaded coupling (collar) that may be used with another example embodiment of a completion pipe according to the present disclosure.

FIG. 8 shows an example embodiment of a double female (box x box) threaded coupling (collar) 114 that may be used with the present example embodiment of a well completion pipe. The collar 114 may be made from steel or other high strength material as is conventional for pipe collars, and may comprise insulated electrical contacts 116 disposed longitudinally below the base of outer threaded connections 114A, and longitudinally above the outer end of inner threaded connections 114B. The insulated electrical contacts 116 may be electrically connected to each other across the collar 114 by an insulated wire 115 disposed in a through bore 117 drilled inside the interior wall of the collar 114 longitudinally between the locations of the insulated electrical contacts 116.

The insulated electrical contacts 116 may comprise adjacent to their lateral edges a wiper seal 118 similar to the seals explained with reference to FIG. 4.

In the present example embodiment, the inner threaded connections 114B may comprise conventional diameter, thread type, thread pitch and thread taper used in pipe collars to connect together joints of pipe having conventional diameter, wall thickness and thread type. The inner threaded connections 114B may make metal to metal seal when engaged with a mating threaded connector on an adjacent well completion pipe joint, to be explained with reference to FIG. 9. The outer threaded connections 114A may have diameter, thread type and thread pitch to threadedly engage corresponding threads on an outer pipe of an adjacent wired pipe joint.

Figure 9:
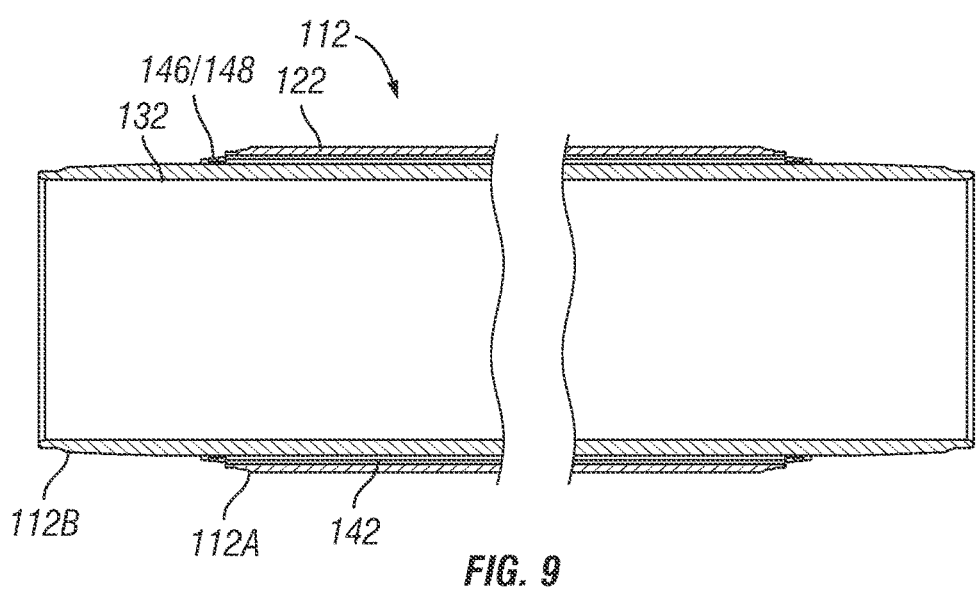
FIG. 9 shows another example embodiment of a completion pipe according to the present disclosure.

FIG. 9 shows another example embodiment of a well completion pipe joint 112 according to the present disclosure. The well completion pipe joint 112 may comprise a conventional (as to dimensions and materials) pipe joint 132 having externally (male) threaded connections 112B on its longitudinal ends. The male threaded connections 112B may have conventional diameter, pitch and thread type corresponding to a conventional pipe joint of the same nominal diameter and wall thickness. The pipe joint (inner pipe) 132 may be nested within, successively, an intermediate layer, e.g., a bonding, conducting and insulating layer 142, which itself is nested within and bonded to an outer conductor pipe 122. The a bonding, conducting and insulating layer 142 may have on its longitudinal ends, electrical contacts 146 disposed within wiper seals 148 similar to those explained with reference to FIG. 5. The outer conductor pipe 122 may have on its longitudinal ends, male threaded connections 112A having thread diameter, pitch, type and taper to engage with the outer threaded connections (114A in FIG. 8) in the collar (114 in FIG. 8). When the male threaded connection 112A is fully engaged with the corresponding collar threaded connection (114A in FIG. 8), a metal to metal seal may be formed. The outer conductor pipe 122 may be made from similar materials, have similar mechanical and electrical properties and may perform similar electrical functions as the inner pipe (22 in FIG. 3) performs in the embodiments described with reference to FIGS. 1 through 7.

In the embodiment shown in FIG. 9, the inner pipe 122 may extend longitudinally beyond the longitudinal ends of the a bonding, conducting and insulating layer 142, in the same manner as the embodiment explained with reference to FIG. 5. In a similar manner, the a bonding, conducting and insulating layer 142 and its associated electrical contacts 146 and wiper seals 148 may extend beyond the longitudinal ends of the outer pipe 122. Thus, when the wired pipe joint 112 is threadedly coupled to a collar (114 in FIG. 8) the pipe joint 132 forms a structural connection with the collar (114 in FIG. 8) and the outer pipe 122 forms a continuous, insulated electrical conductor between the electrical contacts 146 at the opposed longitudinal end of the wired pipe joint 112 and the electrical contacts (116 in FIG. 8) in the collar (114 in FIG. 8). Such well completion pipe joints 112 and collars (114 in FIG. 8) may be connected end to end to form a well completion pipe string similar to the embodiments explained with reference to FIGS. 1 through 7.

It will be appreciated that in the well completion pipe joint 112 of the present example embodiment, the structural pipe is nested inside the outer pipe 122 and an intermediate layer, e.g., the bonding, conducting and insulating layer 142. Thus, using pipe assembly ("make up") procedures for conventional pipe may not be advisable in the present example embodiment because of the need to transmit full make up torque through the outer pipe and the intermediate layer, (the bonding, conducting and insulating layer 142). In assembling a well completion pipe string according to the present embodiment of pipe joints and collars, different procedures and components may be used.

First, to assemble the present example embodiment of well completion pipe joint 112 to a collar (114 in FIG. 8), the collar (114 in FIG. 8) may be rotationally engaged within a conventional pipe assembly apparatus, i.e., the "tongs" used to grip and rotate a pipe string component. The wired pipe joint 112, however, may be gripped and rotated using internal tongs or similar device. One such device is sold by Odfjell Well Services, Hammaren 19, P.O Box 152, NO-4098 Tananger, Norway, under the trademark CRT CASING RUNNING TOOL. Such device frictionally engages the interior wall of a pipe joint to enable rotation or holding without applying force to the exterior wall of the pipe joint.

Figure 10:
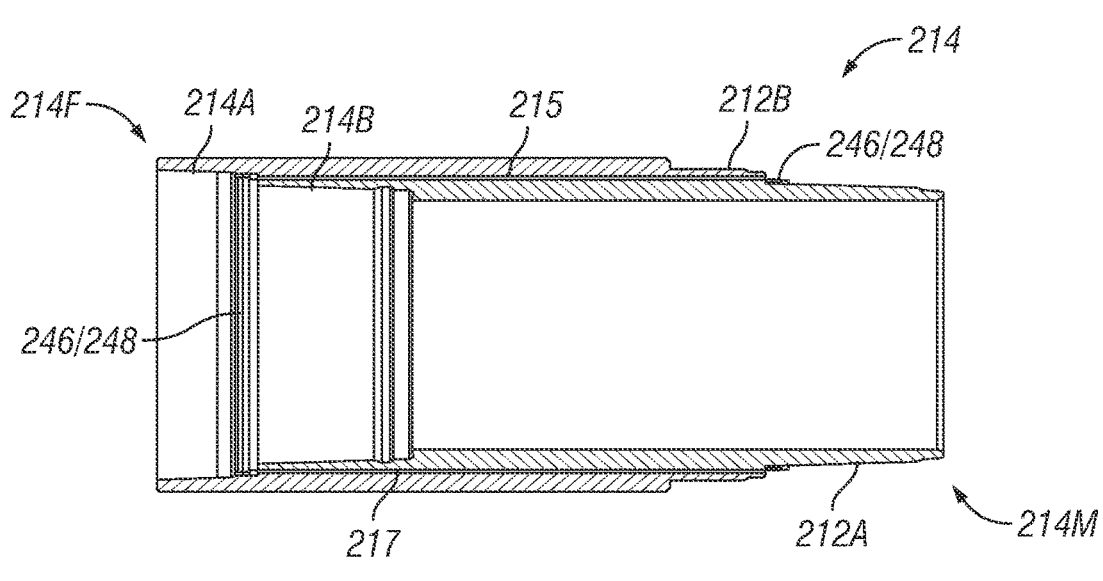
FIG. 10 shows an example embodiment of a "make up" tool joint that may be used with the example embodiment of completion pipe shown in FIG. 9.

It will be appreciated that such internal tong devices may not be available on all wellsite hoisting units, e.g., drilling rigs and workover rigs. In order to make a well completion pipe joint according to the present embodiment more readily assembled using conventional casing running tools, a make up "tool joint" may be affixed to one end of each well completion pipe joint 112 to provide an exterior surface for gripping by conventional pipe tongs. FIG. 10 shows an example embodiment of such a "make up" tool joint 214 that may be used with the example embodiment of well completion pipe shown in FIG. 9. The make up tool joint 214 may comprise at one longitudinal end an inner female threaded connection 214B and outer female threaded connection 214A as part of a box connection 214F. An electrical contact 246 may be disposed on a surface between the inner female threaded connection 214B and the outer female threaded connection 214A. Wiper seals 248 may be disposed on the lateral edges of the electrical contact 246. An insulated wire 215 may be electrically connected to the electrical contact 246 and extend through a bore 217 inside the wall of the make up tool joint 214 and connected to another electrical contact 246 on a pin end 214M of the make up tool joint 214. The pin end 214M may comprise an inner threaded connection 212B and outer threaded connection 212A having thread dimensions corresponding and enabling threaded connection to one of the collars (114 in FIG. 8). The make up tool joint 214 may have full make up and break apart torque applied to its exterior surface because the inner threaded connections 214B, 212B and outer threaded connections 214A, 212A may all be part of the same single component of steel or other high strength material, and thus no torque is transmitted through any device corresponding to the bonding, conducting and insulating layer (142 in FIG. 9).

Therefore, each well completion pipe joint (112 in FIG. 9) may have pre-assembled to it prior to shipment to a well site, a collar such as shown in FIG. 8 on one longitudinal end, and a make up tool joint 214 on its other longitudinal end.

Figure 11:
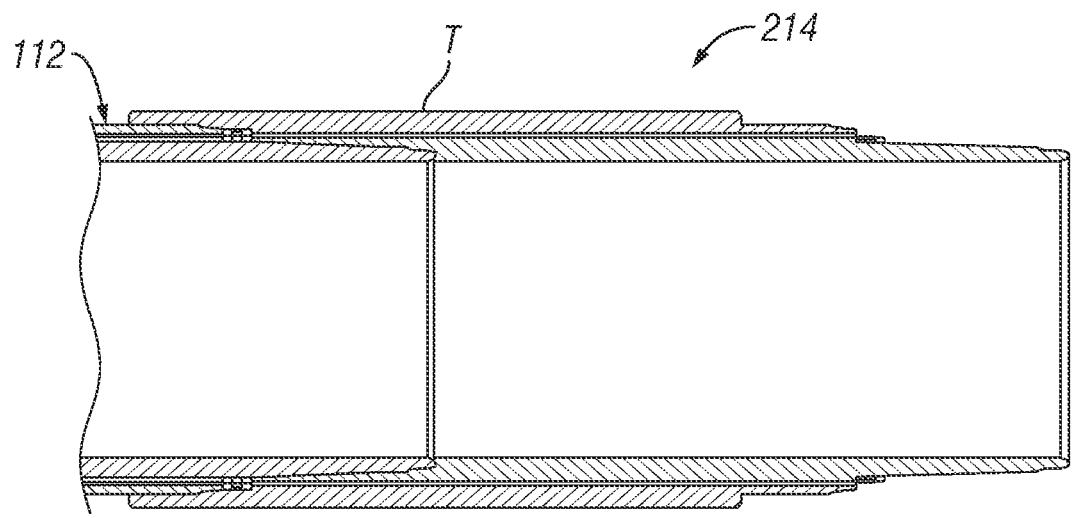
FIG. 11 shows a view of the make up tool joint of FIG. 10 attached to a joint of the completion pipe of FIG. 9 to illustrate an area provided for conventional pipe threading apparatus ("tongs") to grip the completion pipe during assembly or disassembly.
Figure 12:
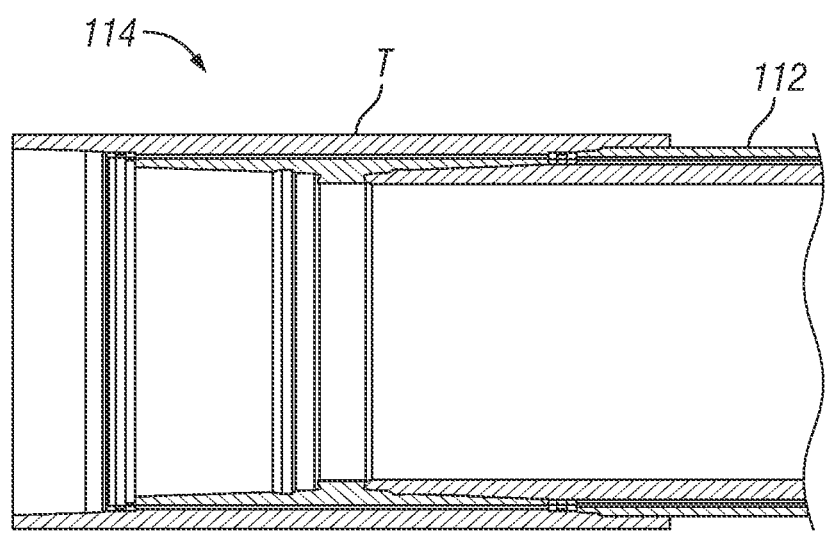
FIG. 12 shows a view of the collar in FIG. 9 attached to a joint of the completion pipe of FIG. 9 to illustrate an area provided for conventional pipe threading apparatus ("tongs") to grip the completion pipe during assembly or disassembly.

FIG. 11 shows a view of the make up tool joint 214 of FIG. 10 attached to one longitudinal end of a joint of the wired completion pipe 112 of FIG. 9 to illustrate an area T provided for conventional pipe threading apparatus ("tongs") to grip the wired completion pipe joint 112 during assembly or disassembly. FIG. 12 shows a view of the collar 114 in FIG. 9 attached to an opposed end of a joint of the wired completion pipe 112 of FIG. 9 to illustrate an area T provided for conventional pipe threading apparatus ("tongs") to grip the wired completion pipe 112 during assembly or disassembly.

FIG. 13 shows a cross sectional view of another embodiment of a well completion pipe 10 according to the present disclosure. The well completion pipe 10 shown in FIG. 13 may be similar in structure to the well completion pipe shown in FIG. 1 and may comprise an inner pipe 22, an intermediate layer 242, which may comprise an electrical insulation, conductor and bonding layer and an outer pipe 32. Two adjacent joints of pipe including the foregoing components may be joined by a collar 14 in the manner explained with reference to FIG. 1. The inner pipe 22, the outer pipe 32 and the intermediate (electrical insulation, conductor and bonding) layer 242 may have respective lengths substantially as explained with reference to FIG. 1, and the inner pipe 22 and outer pipe 32 may comprise threads substantially as explained with reference to FIG. 3 and FIG. 5.

The collar 14 may be made in any form explained elsewhere herein to provide a pressure isolated conductive path (e.g., an insulated electrically conductive path) between the correspondingly connected joints of well completion pipe 10.

Figure 16:
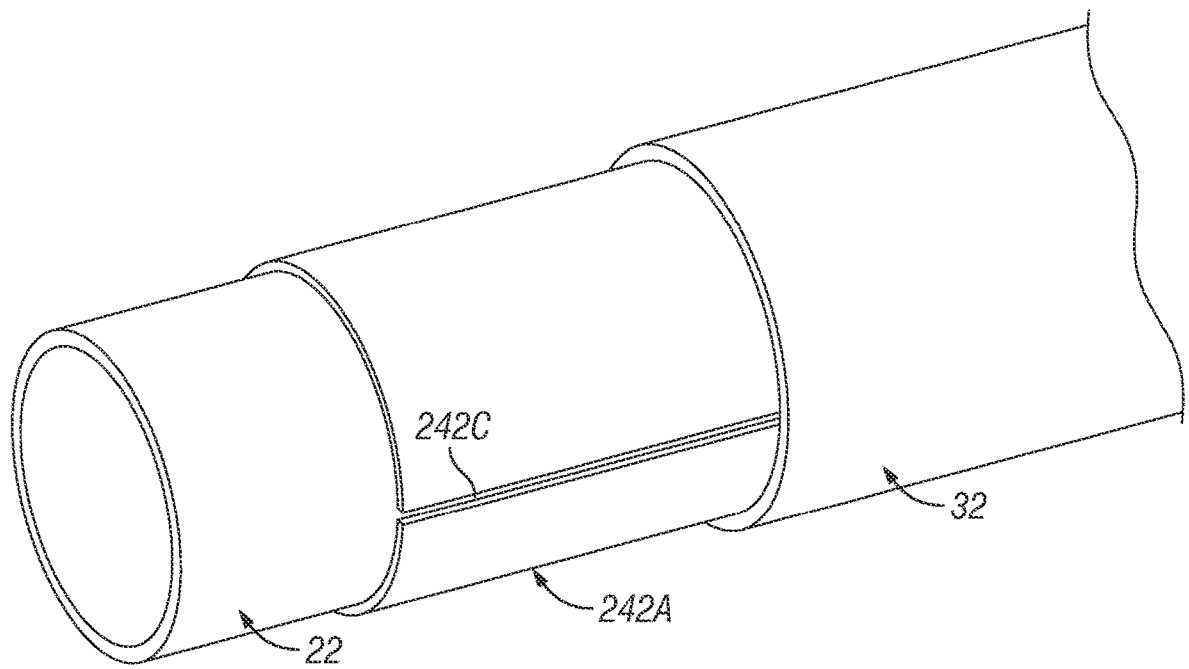
FIG. 16 shows a partial, expanded view of components used to make a pipe joint as in FIG. 13.

FIGS. 14 through 16 show oblique, cut away views of one of the pipe joints shown in FIG. 13 to illustrate some specific features of the present example embodiment. The intermediate layer (electrical insulation, conductor and bonding) 242 may comprise a sleeve 242A formed from malleable, ductile metal, for example, aluminium. The sleeve 242A may comprise a groove, slot or channel ("channel") 242C in which may be disposed an insulated electrical conductor 242B such as a flat cable. The channel 242C may be formed, for example, by milling or cutting the exterior or interior surface of the sleeve 242, or may be provided by the sleeve 242A having an open circumference, that is, by having a circumferential dimension smaller than a circle defined by the radius of the sleeve 242, thereby having a gap or space at the circumferential ends as shown. The electrical conductor 242B may be electrically connected to contact rings 18 each disposed between wiper seals 16 substantially as explained with reference to other embodiments. As will be further explained below, a pipe structure as shown in FIGS. 13 through 16 may be used to provide an isolated conductive path for fluid, that is, such pipe may have a pressure isolated hydraulic or pneumatic channel associated with the completion pipe.

The present example embodiment may have structure similar to that explained with reference to FIG. 1, wherein the outer pipe 32 is a conventionally dimensioned pipe joint. In such cases, when making a well completion pipe joint, the inner pipe 22 may be made from a malleable, ductile metal and have an initial diameter that enables plastic radial deformation when disposed within the outer pipe 32 and the intermediate (electrical insulation, conductor and bonding) layer 242. The electrical insulation, conductor and bonding layer 242 is disposed within the outer pipe 32, and the inner pipe is then disposed within the electrical insulation, conductor and bonding layer 242. The inner pipe 22 may then be radially expanded, such as by hydroforming, to frictionally engage the electrical insulation, conductor and bonding layer 242 and the outer pipe 32. Interference fit between the inner pipe 22, the electrical insulation, conductor and bonding layer 242 and the outer pipe 32 may enable transmitting more torque from the outer pipe 32 to the inner pipe 22 than may be possible using the embodiments explained with reference to FIG. 4. Threads may then be cut on the inner pipe 22 and the outer pipe 32 as explained with reference to other embodiments herein.

In some embodiments, a conventionally dimensioned pipe joint may be the inner pipe 22. The electrical insulation, conductor and bonding layer 242 may be disposed outside the inner pipe 22, and the outer pipe 22 is then disposed about the electrical insulation, conductor and bonding layer 242. The outer pipe 22 may then be compressed to cause interference fit between the outer pipe 32, the electrical insulation, conductor and bonding layer 242 and the inner pipe 22.

In some embodiments, in the intermediate layer, the sleeve 242A may be omitted entirely. In such embodiments, it may be suitable to form a groove or channel in the outer surface of the inner pipe 22 in embodiments wherein the outer pipe 32 is a conventionally dimensioned pipe joint. Such groove or channel may reduce the risk of damaging the electrical conductor 242B when the inner pipe 22 is expanded. In some embodiments, the electrical conductor 242B may be enclosed in a high strength enclosure such as a metal tube to resist crushing. In embodiments wherein the inner pipe 22 is a conventionally dimensioned pipe joint, the inner surface of the outer pipe 32 may comprise such a groove.

Figure 17:
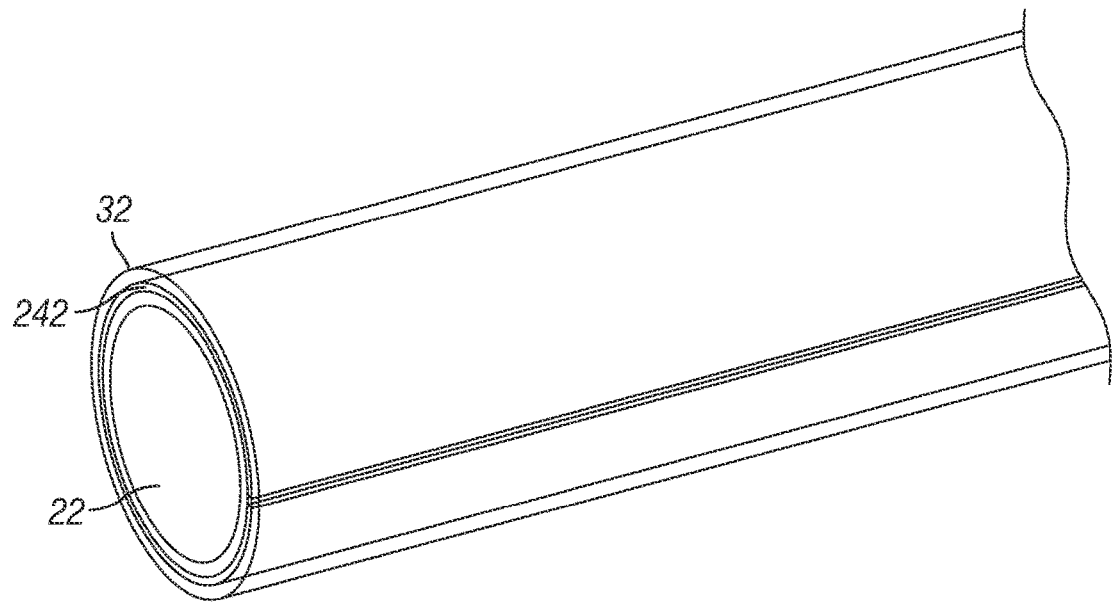
FIG. 17 shows another partial expanded view of the embodiment of FIG. 13.

FIG. 16 shows a partial, expanded view of components used to make a pipe joint as in FIG. 13. FIG. 17 shows a partial, expanded cut away view of a part of the pipe joint disposed between the longitudinal ends to illustrate the relative placement of the components described with reference to FIGS. 13 through 15.

By pre-assembling a collar and make up tool joint to the longitudinal ends of each joint of well completion pipe, it may be possible to use conventional external tongs pipe handing equipment for running a string of wired completion pipe according to the present embodiment.

Figure 18:
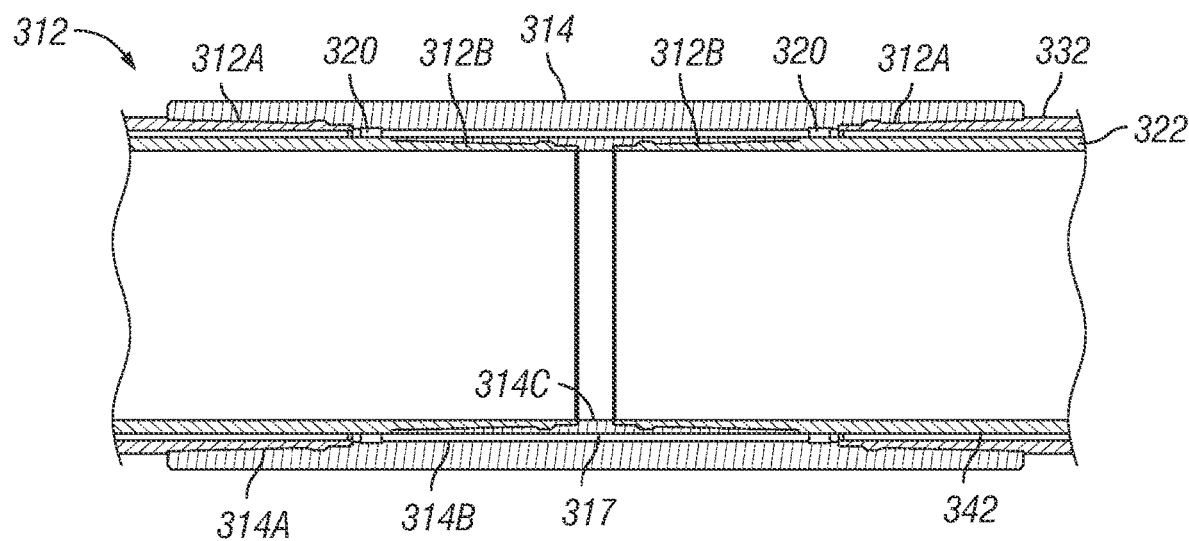
FIG. 18 shows a cross sectional view of two joints of well completion pipe coupled to a collar.

FIGS. 18 through 25 show various views of another example embodiment of a well completion pipe having a pressure isolated conductive channel or pathway arranged to move fluid such as compressed gas or liquid. FIG. 18 shows a cross sectional view of two joints 312 of such well completion pipe each connected to one longitudinal end of a collar 314. The collar 314 may be formed in a manner similar to other embodiments described herein. The joints of well completion pipe 312 may each comprise an inner pipe 322 nested within an intermediate layer 342. The intermediate layer 342 is nested within an outer pipe 332. The relative lengths of the inner pipe 322, the intermediate layer 342 and the outer pipe 332 may correspond to the lengths of corresponding pipe components of other embodiments of the well completion pipe explained with reference to FIGS. 1 through 17. In the present example embodiment, the inner pipe 322 may extend longitudinally beyond the corresponding longitudinal ends of the outer pipe 332. Threads 314B may be formed on the exterior surface of that part of the inner pipe 322 that extends beyond the outer pipe 332. The outer pipe 332 may also have threads 312B formed at its longitudinal ends. The respective threads 312A, 312B may be structured as explained with reference to FIGS. 1 through 17. The collar 314 may comprise inner female threads 314B one each side of a center bulkhead 314C, similar to the embodiment explained with reference to FIGS. 1 through 5. The collar 314 may also have outer threads 314A corresponding to the outer threads in the embodiment of FIGS. 1 through 17. One or more longitudinal bores 317 may extend longitudinally through the collar wall from a position intermediate the inner threads 314B and the outer threads 314A on one side of the bulkhead 314C to a corresponding position on the other side of the bulkhead 314C. The longitudinal end of the outer pipe 312 may be disposed spaced apart longitudinally from the interior wall of the collar 314 to create, when the joint 312 is assembled to the collar 314, a circumferential cavity 320. Corresponding structure may be formed in the collar 314 on the opposite side of the bulkhead 314C. The circumferential cavity 317 may be in fluid communication with a corresponding circumferential cavity 320 on the opposed side of the bulkhead 314C. The one or more longitudinal bores 317 make fluid connection across the bulkhead 314C between the two circumferential cavities 317.

It will be noted that the intermediate layer 342 terminates at a longitudinal position such that the intermediate layer 342 is exposed to the circumferential cavity. In the present example embodiment, the intermediate layer 342 may comprise a pressure isolated fluid path or channel to enable passage of fluid from one end of the joint 312 to the other end.

Figure 19:
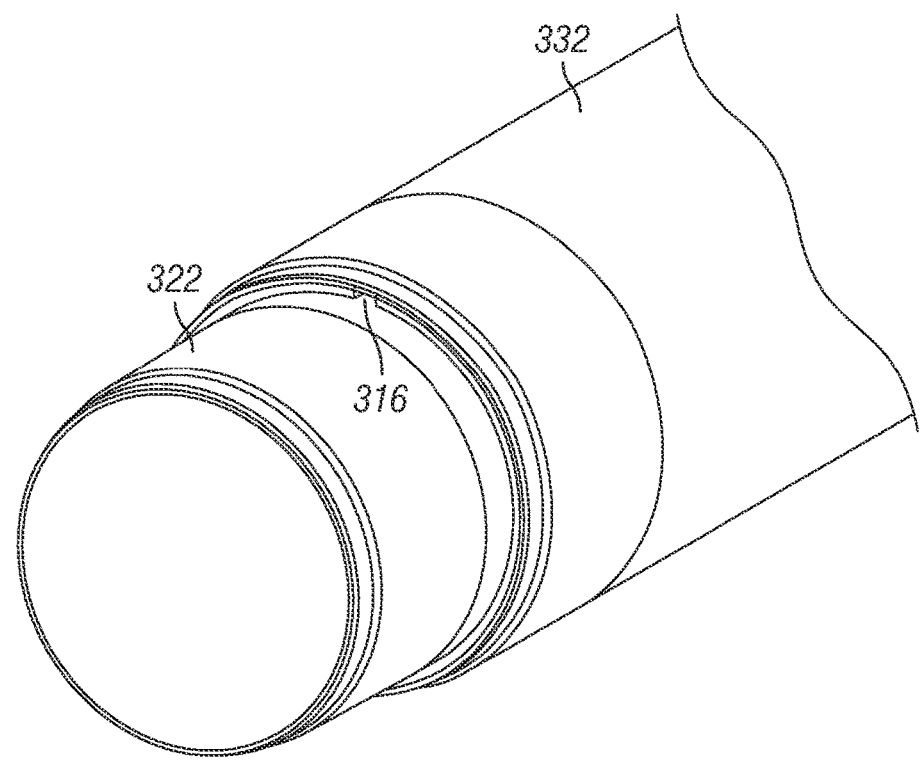
FIGS. 19 and 20 show oblique views of the example embodiment of pipe shown in more detail to illustrate a fluid path or channel formed in an intermediate layer.
Figure 20:
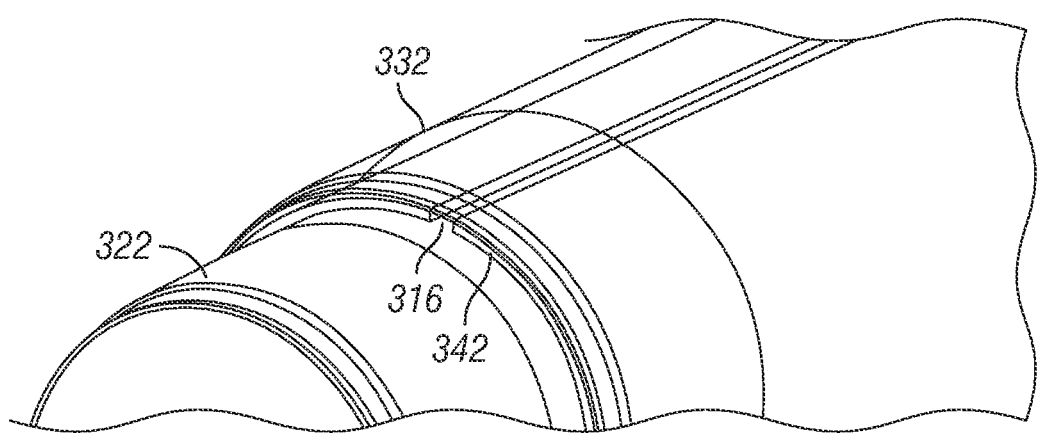

Referring to FIGS. 19 and 20, the intermediate layer 342 may comprise a sleeve made of malleable, ductile metal, for example, aluminium. The sleeve may have an open circumference, that is, when applied to the exterior of the inner pipe 322 or to the interior of the outer pipe 332, a gap or channel 316 is maintained. The channel 316 may extend over the entire longitudinal span of the intermediate layer 342 such that a fluid channel, passage or path along the pipe joint 312 is established. Pressure isolation of the channel 316 is obtained by enclosing the intermediate layer 342 on its interior by the inner pipe 322 and on its exterior by the outer pipe 332. The intermediate layer 342 as may be observed in FIGS. 19 and 20 may terminate in approximately the same longitudinal place as the outer pipe 332. Thus, and again referring to FIG. 18, when the joint 312 is connected to the collar 314, the intermediate layer 342 and thereby the channel 316 terminates in the circumferential chamber 320.

It will also be noted that structurally, the present example embodiment of a well completion pipe is similar to embodiments of a well completion pipe having an insulated electrical conductor as explained with reference to FIGS. 1 through 17. In the present example embodiment, the various forms of insulated electrical conductor may be omitted to provide a pressure isolated path through which fluid such as hydraulic fluid or compressed gas may flow. While the structure of the intermediate layer 342 in the present example embodiment is not limited to a metal sleeve, it may prove advantageous to use such structure for the intermediate layer 342 to avoid having hydraulic fluid or compressed gas coming into contact with materials that may not be suitable for such contact, for example, various fiber reinforced plastics as described with reference to FIGS. 1 through 5. It should be clearly understood, however that using such intermediate layer materials, e.g. fiber reinforced plastic, is within the scope of the present disclosure.

Figure 21:
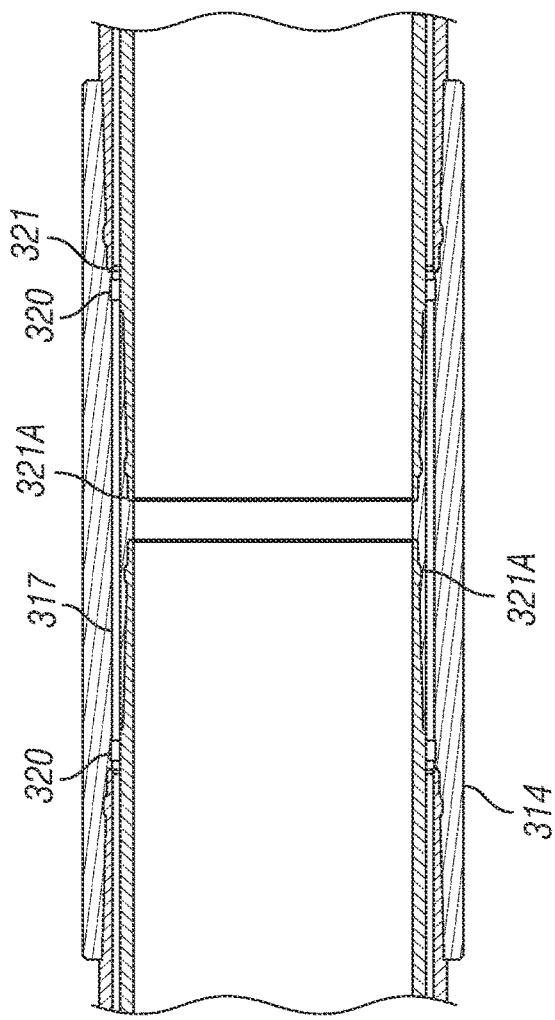
FIGS. 21 and 22 show cross sectional views of the pipe of FIG. 18 to better illustrate circumferential chambers formed on opposed sides of the collar for fluid communication.
Figure 22:
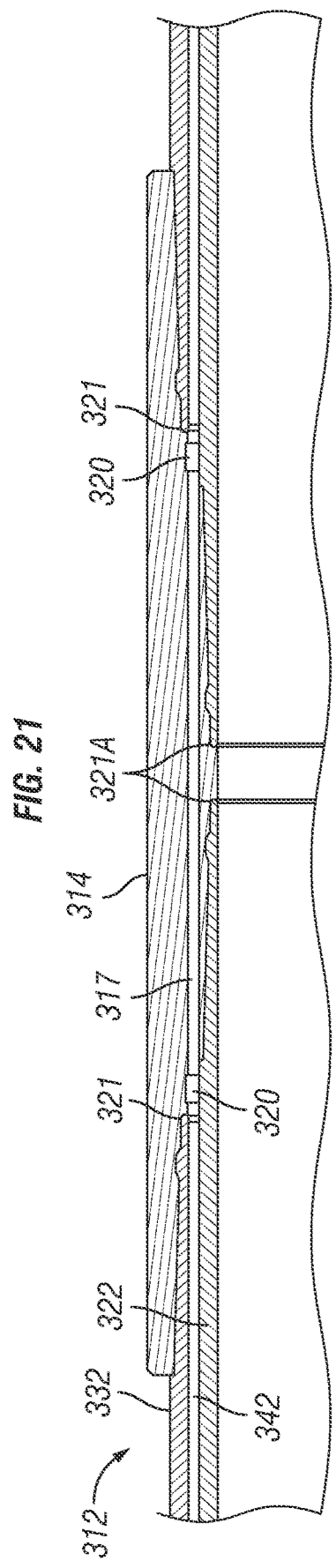

Referring to FIGS. 21 and 22, it may be observed that the circumferential chamber 320 is hydraulically sealed on each side by a metal to metal seal 312, 312A created when the pipe joint 312 is threadedly engaged to the collar 314. In this respect the present example embodiment of well completion pipe is similar to the embodiments explained with reference to FIGS. 1 through 5.

FIG. 23 shows a cross sectional views of a well completion pipe joint 312 at is approaches a collar 314 for assembly on one side of the collar 314; the opposed side of the collar 314 has a fully engaged well completion pipe joint present. FIG. 25 shows a cut away view of well completion pipe joints 312 assembled to a collar 314, wherein a plurality of through bores 317 may be made in the collar 314 to connect hydraulically the chambers 320 on the opposed sides of the collar 314. In this way, fluid may be communicated along the entire length of the assembled well completion pipe without the need for external or internal separate fluid and/or control lines.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A well completion pipe having an insulated electrical conductor, comprising;
   a plurality of pipe joints, each comprising a joint of wellbore tubular, an intermediate layer comprising an insulated electrical conductor disposed inside the joint of wellbore tubular and an inner pipe disposed inside the intermediate layer, the intermediate layer comprising an electrically insulating material on an outer surface, the electrical conductor nested within the insulating material and an electrical insulator arranged to electrically insulate the electrical conductor from the inner pipe and the joint of wellbore tubular;
   wherein the inner pipe extends longitudinally beyond a respective longitudinal end of the joint of wellbore tubular or the joint of wellbore tubular extends longitudinally beyond a respective longitudinal end of the inner pipe;
   wherein the inner pipe and the joint of wellbore tubular comprise respective threaded connections at each longitudinal end, the respective threaded connections forming a metal to metal seal when engaged to corresponding mating threads; and
   an electrical contact disposed at each longitudinal end of the joint of wellbore tubular and in electrical contact with the insulated electrical conductor.

2. The well completion pipe of claim 1 further comprising a collar having at each longitudinal end the corresponding mating threads and an insulated electrical conductor extending between longitudinal ends of the collar, the insulated electrical conductor comprising an insulated electrical contact disposed between an inner one of the corresponding mating threads and an outer one of the corresponding mating threads.

3. The well completion pipe of claim 2 wherein the insulated electrical conductor is disposed in a longitudinal bore extending along an interior of a wall of the collar.

4. The well completion pipe of claim 1 wherein the electrical conductor comprises a wire braid.

5. The well completion pipe of claim 1 wherein the electrical contact is disposed between wiper seals.

6. The well completion pipe of claim 1 wherein the respective threaded connections on the inner pipe and the joint of wellbore tubular have a same pitch.

7. The well completion pipe of claim 1 wherein the joint of wellbore tubular, the electrical conductor and the inner pipe are electrically insulated from each other.

8. The well completion pipe of claim 1 wherein the inner pipe extends longitudinally beyond a respective longitudinal end of the joint of wellbore tubular at one longitudinal end and the joint of wellbore tubular extends longitudinally beyond a respective longitudinal end of the inner pipe at the opposed longitudinal end.

9. A well completion pipe having a pressure isolated conductive path, comprising;
   a plurality of pipe joints, each comprising an outer pipe, an intermediate layer having a passageway extending longitudinally along the intermediate layer, the intermediate layer disposed inside the outer pipe and an inner pipe disposed inside the intermediate layer;
   wherein either (i) the inner pipe extends longitudinally beyond a respective longitudinal end of the outer pipe or (ii) the outer pipe extends longitudinally beyond a respective longitudinal end of the inner pipe;
   wherein the inner pipe and the outer pipe comprise respective threaded connections at each longitudinal end, the respective threaded connections forming a metal to metal seal when engaged to corresponding mating threads;
   wherein the intermediate layer terminates longitudinally between respective longitudinal ends of the inner pipe and the outer pipe, the passageway exposed at each longitudinal end of the intermediate layer; and
   wherein the intermediate layer comprises any of: (i) an electrically insulating material disposed on an outer surface, an electrical conductor is nested within the insulating material and an electrical insulator is arranged to electrically insulate the electrical conductor from the inner pipe and the outer pipe, (ii) a sleeve, (iii) an insulated electrical conductor, and the inner pipe and the outer pipe are in interference fit with each other, or (iv) a layer of insulating material having a closed circumference and a layer of electrically conductive material having a closed circumference.

10. The well completion pipe of claim 9 further comprising a collar having at each longitudinal end the corresponding mating threads and a through bore extending between longitudinal ends of the collar, the through bore terminating longitudinally between an inner one of the corresponding mating threads and an outer one of the corresponding mating threads.

11. The well completion pipe of claim 10 wherein an insulated electrical conductor is disposed in the through bore in the collar.

12. The well completion pipe of claim 11 wherein the intermediate layer comprises an insulated electrical conductor.

13. The well completion pipe of claim 12 wherein the insulated electrical conductor comprises a flat cable or a wire braid.

14. The well completion pipe of claim 9 wherein an electrical contact is coupled to each longitudinal end of the intermediate layer, and the electrical contact is disposed between wiper seals.

15. The well completion pipe of claim 9 wherein the respective threaded connections on the inner pipe and the outer pipe have a same pitch.

16. The well completion pipe of claim 9 wherein the outer pipe, the electrical conductor and the inner pipe are electrically insulated from each other.

17. The well completion pipe of claim 9 wherein the inner pipe extends longitudinally beyond a respective longitudinal end of outer pipe at one longitudinal end and the outer pipe extends longitudinally beyond a respective longitudinal end of the inner pipe at the opposed longitudinal end.

18. The well completion pipe of claim 9 wherein the inner pipe comprises well completion tubular.

19. The well completion pipe of claim 9 wherein the outer pipe comprises well completion tubular.

20. The well completion pipe of claim 9 further comprising a make up tool joint having at one longitudinal end, the corresponding mating threads and an insulated electrical conductor extending between longitudinal ends of the make up tool joint, the insulated electrical conductor comprising an insulated electrical contact disposed between an inner one of the corresponding mating threads and an outer one of the corresponding mating threads, the make up tool joint at another longitudinal end an inner threaded connection and an outer threaded connection having respective thread dimensions to threadedly engage either (i) corresponding mating threads on a collar, wherein the collar comprises at each longitudinal end the corresponding mating threads and an insulated electrical conductor extending between longitudinal ends of the collar, the insulated electrical conductor comprising an insulated electrical contact disposed between an inner one of the corresponding mating threads and an outer one of the corresponding mating threads or (ii) corresponding mating threads on another make up tool joint.

21. The well completion pipe of claim 9 wherein when the intermediate layer comprises a sleeve, the sleeve comprises a malleable, ductile metal.

22. The well completion pipe of claim 21 wherein the malleable, ductile metal comprises aluminum.

23. The well completion pipe of claim 9 wherein when the intermediate layer comprises a sleeve, an insulated electrical conductor is disposed in a groove formed on a surface of the sleeve or in a gap between circumferential ends of the sleeve.

24. The well completion pipe of claim 9 further comprising a make up tool joint having at one longitudinal end, the corresponding mating threads, the make up tool joint at another longitudinal end having an inner threaded connection and an outer threaded connection having respective thread dimensions to threadedly engage either (i) corresponding mating threads on a collar, wherein the collar comprises at each longitudinal end the corresponding mating threads and a through bore extending between longitudinal ends of the collar, the through bore terminating in a chamber disposed between an inner one of the corresponding mating threads and an outer one of the corresponding mating threads or (ii) corresponding mating threads on another make up tool joint.

25. A well completion pipe having an insulated electrical conductor, comprising;
a plurality of pipe joints, each comprising a joint of wellbore tubular, an intermediate layer comprising an insulated electrical conductor disposed inside the joint of wellbore tubular and an inner pipe disposed inside the intermediate layer;
wherein the inner pipe extends longitudinally beyond a respective longitudinal end of the joint of wellbore tubular or the joint of wellbore tubular extends longitudinally beyond a respective longitudinal end of the inner pipe;
wherein the inner pipe and the joint of wellbore tubular comprise respective threaded connections at each longitudinal end, the respective threaded connections forming a metal to metal seal when engaged to corresponding mating threads;
an electrical contact disposed at each longitudinal end of the joint of wellbore tubular and in electrical contact with the insulated electrical conductor; and
wherein the intermediate layer comprises any of: (i) an electrically insulating material disposed on an outer surface, the electrical conductor being nested within the insulating material and an electrical insulator is arranged to electrically insulate the electrical conductor from the inner pipe and the outer pipe, (ii) a sleeve, (iii) the insulated electrical conductor, and the inner pipe and the outer pipe are in interference fit with each other, or (iv) a layer of insulating material having a closed circumference and a layer of electrically conductive material having a closed circumference.

26. The well completion pipe of claim 25 further comprising a collar having at each longitudinal end the corresponding mating threads and an insulated electrical conductor extending between longitudinal ends of the collar, the insulated electrical conductor comprising an insulated electrical contact disposed between an inner one of the corresponding mating threads and an outer one of the corresponding mating threads.

27. The well completion pipe of claim 26 wherein the insulated electrical conductor is disposed in a longitudinal bore extending along an interior of a wall of the collar.

28. The well completion pipe of claim 25 wherein the electrical conductor comprises a wire braid.

29. The well completion pipe of claim 25 wherein the electrical contact is disposed between wiper seals.

30. The well completion pipe of claim 25 wherein the respective threaded connections on the inner pipe and the joint of wellbore tubular have a same pitch.

31. The well completion pipe of claim 25 wherein the joint of wellbore tubular, the electrical conductor and the inner pipe are electrically insulated from each other.

32. The well completion pipe of claim 25 wherein the inner pipe extends longitudinally beyond a respective longitudinal end of the joint of wellbore tubular at one longitudinal end and the joint of casing extends longitudinally beyond a respective longitudinal end of the inner pipe at the opposed longitudinal end.

33. The well completion pipe of claim 25 wherein when the intermediate layer comprises a sleeve, the sleeve comprises a malleable, ductile metal.

34. The well completion pipe of claim 33 wherein the malleable, ductile metal comprises aluminum.

35. The well completion pipe of claim 25 wherein when the intermediate layer comprises a sleeve, an insulated electrical conductor is disposed in a groove formed on a surface of the sleeve or in a gap between circumferential ends of the sleeve.

* * * * *